(12) United States Patent
Faust et al.

(10) Patent No.: US 11,980,134 B2
(45) Date of Patent: May 14, 2024

(54) OPERATOR COMMANDED PLACEMENT FOR CONTROL OF FILLING MECHANISMS

(71) Applicant: Deere & Company, Moline, IL (US)

(72) Inventors: Jeremy J. Faust, Grimes, IA (US); Kellen O'Connor, Grimes, IA (US)

(73) Assignee: Deere & Company, Moline, IL (US)

( * ) Notice: Subject to any disclaimer, the term of this patent is extended or adjusted under 35 U.S.C. 154(b) by 566 days.

(21) Appl. No.: 17/196,023

(22) Filed: Mar. 9, 2021

(65) Prior Publication Data

US 2022/0287239 A1 Sep. 15, 2022

(51) Int. Cl.
| A01D 90/10 | (2006.01) |
| A01D 43/08 | (2006.01) |
| A01D 90/02 | (2006.01) |
| B60W 10/30 | (2006.01) |
| B65G 67/22 | (2006.01) |

(52) U.S. Cl.
CPC ......... *A01D 90/105* (2013.01); *A01D 43/087* (2013.01); *A01D 90/02* (2013.01); *A01D 90/10* (2013.01); *B60W 10/30* (2013.01); *B65G 67/22* (2013.01); *B60W 2300/158* (2013.01); *B60W 2420/42* (2013.01); *B60W 2710/30* (2013.01); *B65G 2814/0302* (2013.01); *B65G 2814/0326* (2013.01)

(58) Field of Classification Search
CPC .... A01D 90/105; A01D 43/087; A01D 90/02; A01D 90/10; A01D 41/1217; A01D 43/073; B60W 10/30; B60W 2300/158; B60W 2420/42; B60W 2710/30; B65G 67/22; B65G 2814/0302; B65G 2814/0326; B60K 2370/1438; B60K 2370/171; B60K 2370/61; B60K 35/00; B60K 37/06

See application file for complete search history.

(56) References Cited

U.S. PATENT DOCUMENTS

| 5,575,316 | A | 11/1996 | Pollklas |
| 5,749,783 | A | 5/1998 | Pollklas |
| 5,957,773 | A | 9/1999 | Olmsted et al. |
| 6,097,425 | A | 8/2000 | Behnke et al. |
| 6,216,071 | B1 | 4/2001 | Motz |
| 6,587,772 | B2 | 7/2003 | Behnke |

(Continued)

FOREIGN PATENT DOCUMENTS

| DE | 19647522 A1 | 5/1998 |
| DE | 202012103730 U1 | 10/2012 |

(Continued)

OTHER PUBLICATIONS

Extended European Search Report issued in European Patent Application No. 22170901.7, dated Feb. 24, 2023, 10 pages.

(Continued)

*Primary Examiner* — Kidest Bahta

(74) *Attorney, Agent, or Firm* — Joseph R. Kelly; Kelly, Holt & Christenson, PLLC

(57) ABSTRACT

An agricultural harvester has a frame and a spout that is mounted to the frame. A display shows a representation of harvested crop in a receiving vessel. A control system detects an operator input selecting a portion of the receiving vessel and automatically controls a fill control system to being filling the receiving vessel, at the selected portions of the receiving vessel, with harvested material.

20 Claims, 14 Drawing Sheets

(56) References Cited

U.S. PATENT DOCUMENTS

| | | |
|---|---|---|
| 7,877,181 B2 | 1/2011 | Chervenka et al. |
| 8,126,620 B2 | 2/2012 | Ringwald et al. |
| 8,499,537 B2 | 8/2013 | Correns et al. |
| 9,043,096 B2 | 5/2015 | Zielke et al. |
| 9,107,344 B2 | 8/2015 | Madsen et al. |
| 9,119,342 B2 | 9/2015 | Bonefas |
| 9,188,986 B2 | 11/2015 | Baumann |
| 9,468,145 B2 | 10/2016 | Coppinger et al. |
| 9,642,305 B2 | 5/2017 | Nykamp et al. |
| 9,949,435 B2 | 4/2018 | Banks, Jr. et al. |
| 9,949,462 B2 | 4/2018 | Zimmerman |
| 9,973,710 B2 | 5/2018 | Boydens et al. |
| 10,264,723 B2 | 4/2019 | Gresch et al. |
| 10,299,433 B2 | 5/2019 | Biggerstaff et al. |
| 10,368,488 B2 | 8/2019 | Becker et al. |
| 10,609,864 B2 | 4/2020 | Conrad et al. |
| 10,830,634 B2 | 11/2020 | Blank et al. |
| 10,834,872 B2 | 11/2020 | Farley et al. |
| 2002/0082757 A1 | 6/2002 | Behnke |
| 2002/0083695 A1 | 7/2002 | Behnke et al. |
| 2003/0174207 A1* | 9/2003 | Alexia ............... A01D 43/073 348/86 |
| 2004/0004544 A1 | 1/2004 | Knutson |
| 2006/0240884 A1 | 10/2006 | Klimmer |
| 2007/0135190 A1 | 6/2007 | Diekhans |
| 2008/0083475 A1 | 4/2008 | Lamb |
| 2009/0044505 A1 | 2/2009 | Huster et al. |
| 2010/0042297 A1 | 2/2010 | Foster et al. |
| 2010/0066517 A1 | 3/2010 | Posselius et al. |
| 2010/0266377 A1 | 10/2010 | Yoder |
| 2010/0285855 A1 | 11/2010 | Chervenka et al. |
| 2010/0332051 A1 | 12/2010 | Kormann |
| 2011/0061762 A1 | 3/2011 | Madsen et al. |
| 2011/0213531 A1 | 9/2011 | Farley |
| 2011/0307149 A1 | 12/2011 | Pighi et al. |
| 2012/0215381 A1* | 8/2012 | Wang ................. A01B 69/008 701/1 |
| 2012/0215394 A1 | 8/2012 | Wang et al. |
| 2012/0221213 A1 | 8/2012 | Seeger |
| 2012/0263560 A1 | 10/2012 | Diekhans et al. |
| 2012/0265412 A1 | 10/2012 | Diekhans et al. |
| 2012/0302299 A1 | 11/2012 | Behnke et al. |
| 2013/0166344 A1 | 6/2013 | Grothaus et al. |
| 2013/0231823 A1 | 9/2013 | Wang et al. |
| 2014/0082442 A1 | 3/2014 | Whetsel |
| 2014/0224377 A1* | 8/2014 | Bonefas ............... G05D 1/0251 141/94 |
| 2015/0168187 A1 | 6/2015 | Meyers |
| 2015/0245560 A1 | 9/2015 | Middelberg et al. |
| 2015/0264866 A1 | 9/2015 | Foster et al. |
| 2015/0308070 A1 | 10/2015 | Deines |
| 2016/0009509 A1* | 1/2016 | Bonefas ............... H04N 13/128 701/50 |
| 2016/0348324 A1 | 12/2016 | Engelmann et al. |
| 2017/0042088 A1 | 2/2017 | Nykamp et al. |
| 2017/0082442 A1 | 3/2017 | Anderson |
| 2017/0088147 A1 | 3/2017 | Tentinger et al. |
| 2017/0208742 A1 | 7/2017 | Ingibergsson et al. |
| 2017/0336787 A1* | 11/2017 | Pichlmaier ........... A01B 69/008 |
| 2018/0022559 A1 | 1/2018 | Knutson |
| 2018/0334136 A1 | 11/2018 | Chaston et al. |
| 2019/0261561 A1 | 8/2019 | Heitmann |
| 2019/0332987 A1 | 10/2019 | Marsolek et al. |
| 2020/0073543 A1 | 3/2020 | Koch et al. |
| 2020/0090094 A1 | 3/2020 | Blank |
| 2020/0128740 A1 | 4/2020 | Suleman |
| 2020/0133262 A1 | 4/2020 | Suleman et al. |
| 2020/0178049 A1 | 6/2020 | Suleman |
| 2020/0214205 A1 | 7/2020 | De Smedt et al. |
| 2020/0319655 A1 | 10/2020 | Desai et al. |
| 2020/0325655 A1 | 10/2020 | Hageman et al. |
| 2023/0247942 A1 | 8/2023 | Jager et al. |

FOREIGN PATENT DOCUMENTS

| | | |
|---|---|---|
| DE | 102019202950 | 9/2019 |
| EP | 1977640 B1 | 2/2011 |
| EP | 2311307 | 12/2011 |
| EP | 2510775 A1 | 10/2012 |
| EP | 2798939 A1 | 11/2014 |
| EP | 2929773 B1 | 1/2018 |
| EP | 3315006 | 5/2018 |
| EP | 3315007 A1 | 5/2018 |
| EP | 3643159 A1 | 4/2020 |
| EP | 3409097 | 7/2020 |
| EP | 3760026 A1 | 1/2021 |
| EP | 3316218 | 4/2021 |
| WO | 2011104085 A1 | 9/2011 |
| WO | 2015011237 A2 | 1/2015 |
| WO | 2020038810 A1 | 2/2020 |

OTHER PUBLICATIONS

Extended European Search Report and Written Opinion issued in European Patent Application No. 22156203.6, dated Jul. 21, 2022, in 11 pages.
U.S. Appl. No. 17/321,584 Non Final Office Action dated Feb. 13, 2023, 9 pages.
U.S. Appl. No. 17/321,584 Office Action dated Oct. 31, 2022, 15 pages,.
Extended European Search Repost and Written Opinion issued in European Patent Application No. 22177642.0 dated Nov. 11, 2022, 8 pages.
U.S. Appl. No. 17/321,584 Final Office Action dated Aug. 15, 2022, 35 pages.
Extended European Search Report issued in European Patent Application No. 22159163.9, dated Aug. 3, 2022, 7 pages.
Extended European Search Report issued in European Patent Application No. 22183092.0, dated Mar. 24, 2023, 10 pages.
Extended European Search Report and Written Opinion Issued in European Patent Application No. 22159163.9, dated Aug. 3, 2022, in 07 pages.
Extended European Search Report and Written Opinion issued in European Patent Application No. 22177644.6, dated Nov. 25, 2022, in 08 pages.
U.S. Appl. No. 17/321,584, filed May 17, 2021 Application and Drawings, 47 pages.
U.S. Appl. No. 17/386,975, filed Jul. 28, 2021, Application and Drawings, 54 pages.
U.S. Appl. No. 17/360,291, filed Jun. 28, 2021, Application and Drawings, 43 pages.
U.S. Appl. No. 17/210,691, filed Mar. 24, 2021, Application and Drawings, 60 pages.
U.S. Appl. No. 17/360,282, filed Jun. 28, 2021, Application and Drawings, 51 pages.
U.S. Appl. No. 17/321,584 Office Action dated May 11, 2022, 34 pages.
U.S. Appl. No. 17/321,584 Office Action dated Jan. 26, 2022, 24 pages.
U.S. Appl. No. 17/321,584 Office Action dated Sep. 17, 2021, 25 pages.
Notice of Allowance for U.S. Appl. No. 17/360,291 dated Oct. 4, 2023, 9 pages.
U.S. Appl. No. 17/360,291 Notice of Allowance dated Nov. 13, 2023, 5 pages.
U.S. Appl. No. 17/210,691 Non-Final Office Action dated Nov. 9, 2023, 8 pages.
U.S. Appl. No. 17/485,710 Notice of Allowance dated Nov. 1, 2023, 9 pages.

* cited by examiner

OPERATOR COMMANDED PLACEMENT FOR CONTROL OF FILLING MECHANISMS

FIELD OF THE DESCRIPTION

The present description relates to mobile work machines. More specifically, the present description relates to implementing operator commanded placement of filling mechanisms when filling a receiving vehicle.

BACKGROUND

There are a wide variety of different types of mobile work machine such as agricultural vehicles and construction vehicles. Some vehicles include harvesters, such as forage harvesters, sugar cane harvesters, combine harvesters, and other harvesters, that harvest grain or other crop. Such harvesters often unload into carts which may be pulled by tractors or semi-trailers as the harvesters are moving. Some construction vehicles include vehicles that remove asphalt or other similar materials. Such machines can include cold planers, asphalt mills, asphalt grinders, etc. Such construction vehicles often unload material into a receiving vehicle, such as a dump truck or other vehicle with a receiving vessel.

As one example, while harvesting in a field using a forage harvester, an operator attempts to control the forage harvester to maintain harvesting efficiency, during many different types of conditions. The soil conditions, crop conditions, and other things can all change. This may result in the operator changing control settings. This means that the operator needs to devote a relatively large amount of attention to controlling the forage harvester.

At the same time, a semi-truck or tractor-pulled cart is often in position relative to the forage harvester (e.g., behind the forage harvester or alongside the forage harvester) so that the forage harvester can fill the truck or cart while moving through the field. In some current systems, this requires the operator of the forage harvester to control the position of the unloading spout and flap so that the truck or cart is filled evenly, but not overfilled. Even a momentary misalignment between the spout and the truck or cart may result in hundreds of pounds of harvested material being dumped on the ground, or elsewhere, rather than in the truck or cart.

Other harvesters such as combine harvesters and sugar cane harvesters, can have similar difficulties. Also, construction vehicles can be difficult to operate while attempting to maintain alignment with a receiving vehicle.

The discussion above is merely provided for general background information and is not intended to be used as an aid in determining the scope of the claimed subject matter.

SUMMARY

An agricultural harvester has a frame and a spout that is mounted to the frame. A display shows a representation of harvested crop in a receiving vessel. A control system detects an operator input selecting a portion of the representation of the receiving vessel and automatically controls a fill control system to begin filling the receiving vessel, at the selected portion of the receiving vessel, with harvested material.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
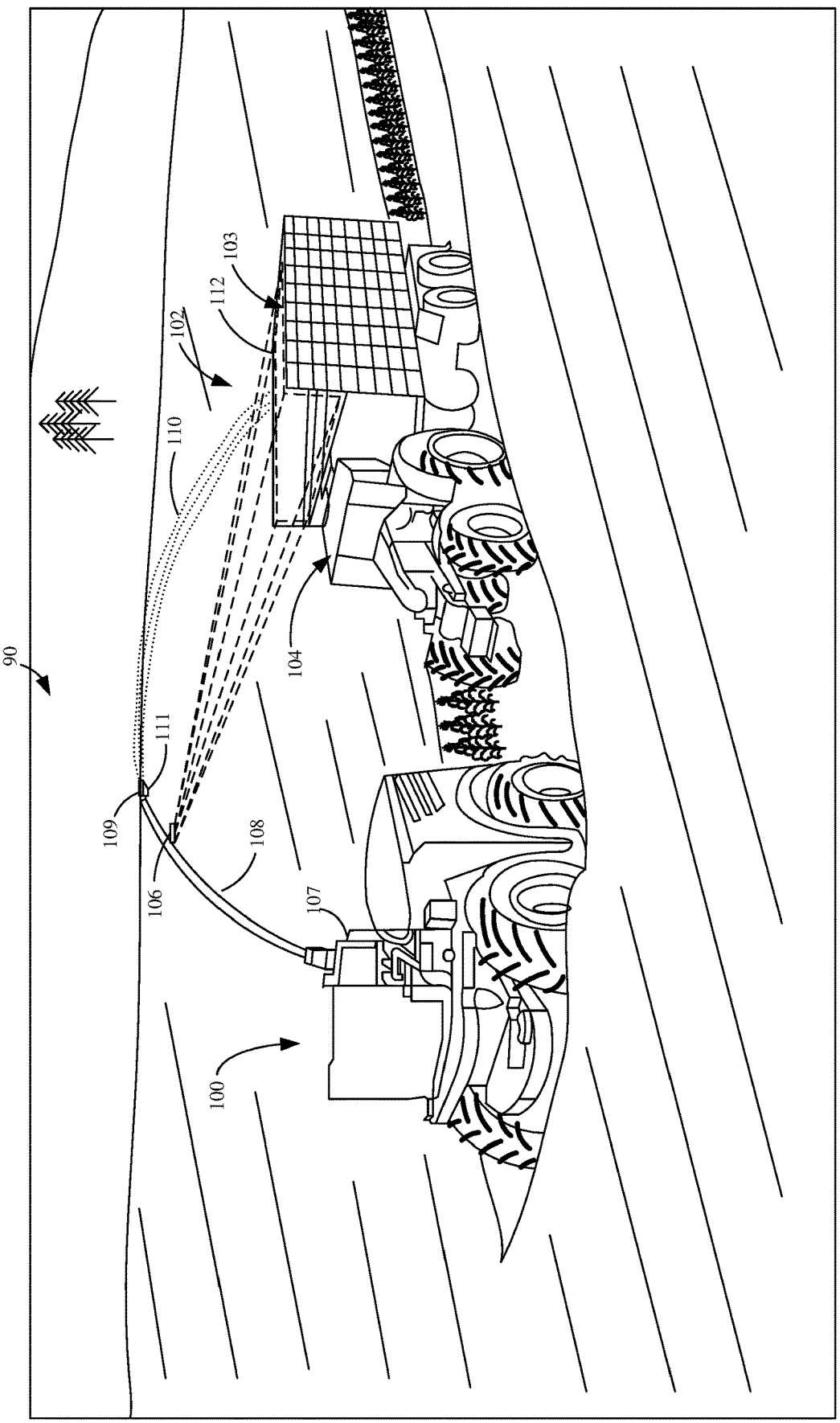
FIG. 1 is a pictorial illustration of one example of a work machine which comprises a forage harvester filling a receiving vehicle, with the receiving vehicle in a position behind the forage harvester.

The present discussion proceeds with respect to an agricultural harvester, but it will be appreciated that the present discussion is also applicable to construction machines as well, such as those discussed elsewhere herein. As discussed above, it can be very difficult for an operator to maintain high efficiency in controlling a harvester, and also to optimally monitor the position of the receiving vehicle. This difficulty can even be exacerbated when the receiving vehicle is located behind the forage harvester, so that the forage harvester is executing a rear unloading operation, but the difficulty also exists in side-by-side unloading scenarios.

In order to address these issues, some automatic cart filling control systems have been developed to automate portions of the filling process. One such automatic fill control system uses a stereo camera on the spout of the harvester to capture an image of the receiving vehicle. An image processing system determines dimensions of the receiving vehicle and the distribution of the crop deposited inside the receiving vehicle. The system also detects crop height within the receiving vehicle, in order to automatically aim the spout toward empty spots and control the flap position to achieve a more even fill, while reducing spillage. Such systems can fill the receiving vehicle according to a fill strategy (such as front-to-back, back-to-front, etc.) that is set by the operator or that is set in other ways.

However, there may be reasons that an operator wishes to at least temporarily deviate from the fill strategy. For instance, if the operator notices a void in the receiving vehicle that is not as full as the operator wishes, the operator may wish to temporarily switch filling to the location of the void to fill it to a higher fill level. Similarly, if the operator sees a certain type of terrain ahead, the operator may wish to increase the load at a particular location in the receiving vehicle to increase traction or stability over the terrain. To do this, the operator currently needs to disable the automatic fill control system, manually reset spout and flap angles, wait until the spout and flap are repositioned, adjust the position if necessary, wait until the desired fill operation is complete (e.g., the void is filled) and then re-engage the automatic fill control system. This can be very cumbersome, especially while trying to simultaneously control the harvester.

The present description thus proceeds with respect to a mobile work machine that detects and displays, on an operator display, a current location where material is being loaded in a receiving vessel. The present system detects an operator input command on the operator display, identifying a different location in the receiving vessel. A control system automatically controls the machine to switch to loading the material into the receiving vessel at the different location commanded by the operator input command. The present discussion also proceeds with respect to an example in which a user touch gesture can be used to quickly select an automatic fill strategy.

FIG. 1 is a pictorial illustration showing one example of a self-propelled forage harvester 100 filling a tractor-pulled grain cart (or receiving vehicle) 102. Cart 102 thus defines an interior that forms a receiving vessel 103 for receiving harvested material through a receiving area 112. In the example shown in FIG. 1, a tractor 104, that is pulling grain cart 102, is positioned directly behind forage harvester 100. Also, in the example illustrated in FIG. 1, forage harvester 100 has a camera 106 mounted on the spout 108 through which the harvested material 110 is traveling. The spout 108 can be pivotally or rotationally mounted to a frame 107 of harvester 100. Camera 106 can be a stereo-camera or a mono-camera that captures an image (e.g., a still image or video) of the receiving area 112 of cart 102. In the example shown in FIG. 1, the receiving area 112 is defined by an upper edge of the walls of cart 102.

When harvester 100 has an automatic fill control system that includes image processing, as discussed above, the automatic fill control system can gauge the height of harvested material in cart 102, and the location of that material. The system thus automatically controls the position of spout 108 and flap 109 to direct the trajectory of material 110 into the receiving area 112 of cart 102 to obtain an even fill throughout the entire length and width of cart 102, while not overfilling cart 102. By automatically, it is meant, for example, that the operation is performed without further human involvement except, perhaps, to initiate or authorize the operation.

Figure 2:
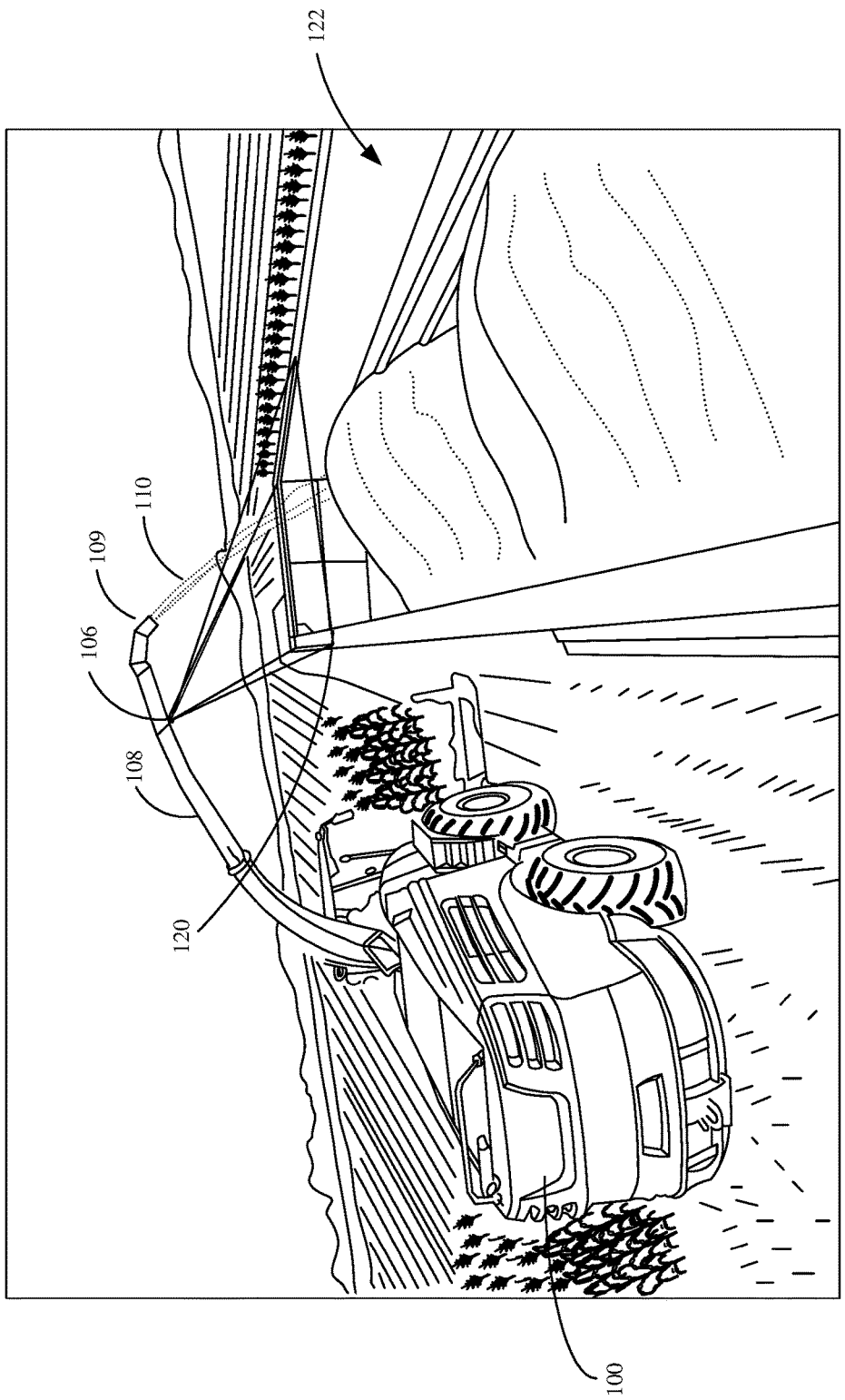
FIG. 2 is a pictorial illustration of one example of a work machine which comprises a forage harvester filling a receiving vehicle that is alongside the forage harvester.

FIG. 2 is a pictorial illustration showing another example of a self-propelled forage harvester 100, this time loading a semi-trailer (or receiving vessel on a receiving vehicle) 122 in a configuration in which a semi-tractor is pulling semi-trailer 122 alongside forage harvester 100. Therefore, the spout 108 and flap 109 are positioned to unload the harvested material 110 to fill trailer 122 according to a pre-defined side-by-side fill strategy. Again, FIG. 2 shows that camera 106 can capture an image (which can include a still image or video) of semi-trailer 122. In the example illustrated in FIG. 2, the field of view of camera 106 is directed toward the receiving area 120 of trailer 122 so that image processing can be performed to identify a landing point for the harvested material in trailer 122.

In other examples, where machine 100 is a combine harvester, it may be that the spout 108 is not moved relative to the frame during normal unloading operations. Instead, the relative position of the receiving vehicle 102, 122 and the combine harvester is changed in order to fill the receiving vessel 103 as desired. Thus, if a front-to-back fill strategy is to be employed, then the relative position of the receiving vessel, relative to the combine harvester, is changed so that the spout is first filling the receiving vessel at the front end, and then gradually fills the receiving vessel moving rearward. In such an example, the combine harvester and towing vehicle may have machine synchronization systems which communicate with one another. When the relative position of the two vehicles is to change, then the machine synchronization system on the combine harvester can send a message to the machine synchronization system on the towing vehicle to nudge the towing vehicle slightly forward or rearward relative to the combine harvester, as desired. By way of example, the machine synchronization system on the combine harvester may receive a signal from the fill control system on the combine harvester indicating that the position in the receiving vessel that is currently being filled is approaching its desired fill level. In that case, the machine synchronization system on the combine harvester can send a "nudge" signal to the machine synchronization system on the towing vehicle. The nudge, once received by the machine synchronization system on the towing vehicle, causes the towing vehicle to momentarily speed up or slow down, thus nudging the position of the receiving vessel forward or rearward, respectively, relative to the combine harvester.

Figure 3:
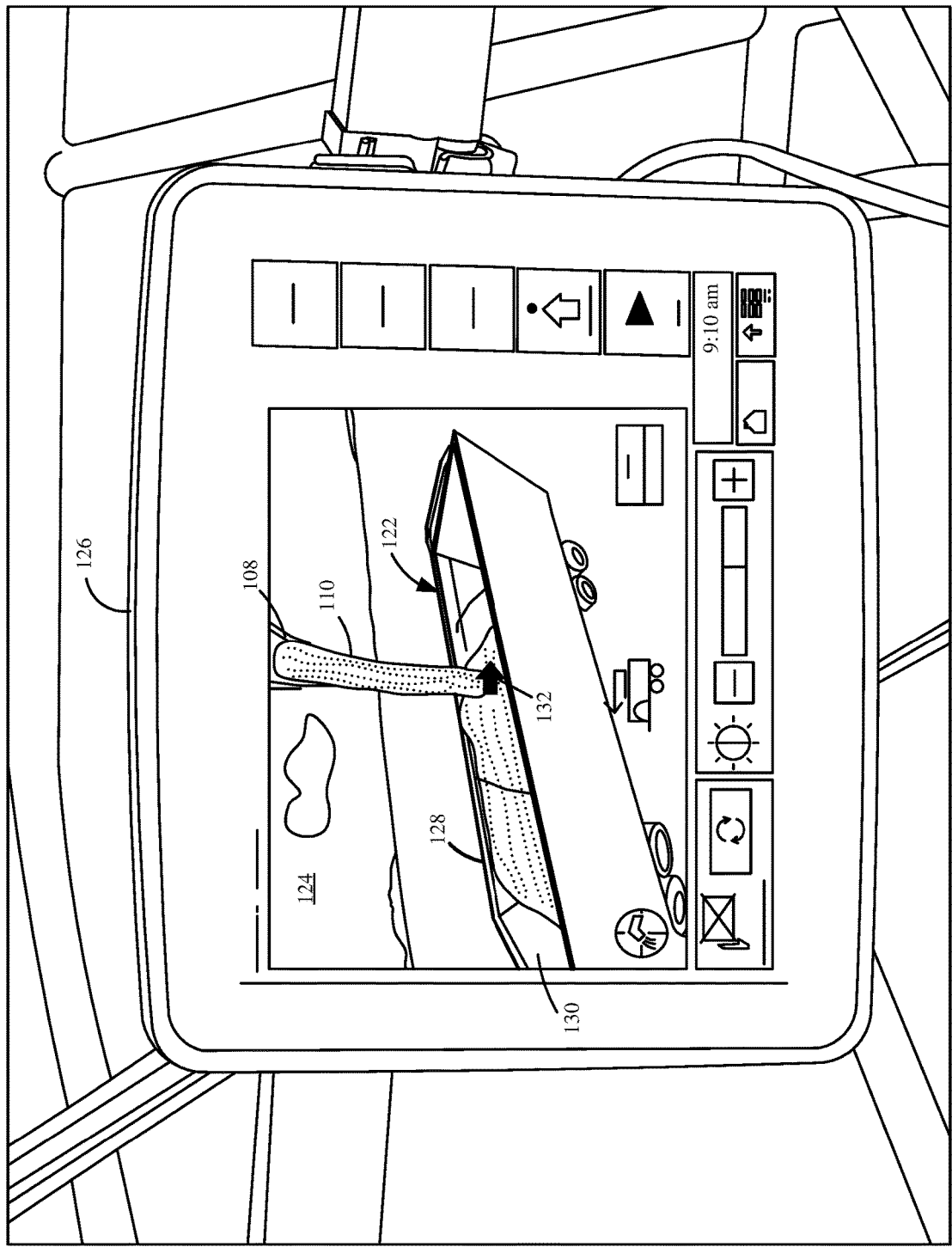
FIG. 3 is a pictorial illustration of an operator display showing video of a filling operation.

FIG. 3 is a pictorial illustrating showing one example of an operator interface display 124 that can be displayed on a display mechanism 126, for the operator in an operator compartment of forage harvester 100. The operator interface display 124 in FIG. 3 shows a view of images (or video) captured by camera 106 of material 110 entering trailer 122. An image processing system on harvester 100 illustratively identifies the perimeter of the opening 128 in trailer 122 and also processes the image of the material 110 in trailer 122 to determine the fill height relative to opening 128. The perimeter defining opening 128 can be visually enhanced by overlaying a visual overlay over the opening 128 so that the operator can easily identify the opening 128, as it is being recognized by the image processing system.

In some cases the operator sees that, while the material 110 is generally filling trailer 122 evenly, there may be voids in the trailer 122, such as a void 130 at the forward end of trailer 122. In that case, it may be that the operator wishes to fill void 130 with more material before continuing to fill the remainder of trailer 122. Thus, as is discussed in greater detail below, a fill control system allows the operator to use a touch gesture (or other command input, such as a point and click input) selecting the area of trailer 122 on display 124 that corresponds to the void 130. The fill control system thus allows the operator to provide an input through interface 124, marking a location (such as the location of void 130) where material 110 is to be directed.

For example, where the display screen on mechanism 126 is a touch sensitive display screen, then the operator may simply touch the screen in the area of void 130. The touch gesture will be detected by the fill control system and the fill control system will automatically generate control signals to move spout 108 so that it is depositing material 110 in the area of void 130.

Generating the control signals to reposition spout 108 can be done in different ways. For instance, once the operator touches or otherwise selects (such as with a point and click device) an area of display 124, the control system identifies the pixel or pixel sets that were selected (e.g., touched or otherwise selected) and, from those pixels, identifies a corresponding physical area or landing point within trailer 122. The control system can then calculate the position that spout 108 needs to be in in order to fill material 110 in that particular landing point in trailer 122.

In one example, spout 108 keeps depositing material in the area of void 130 (or another location commanded by the operator input) until some criteria are met, at which point the fill control system moves spout 108 back to resume filling trailer 122 at the location it was at prior to moving to the area of void 130.

The criteria for resuming the prior fill operation can be any of a variety of different criteria. In one example, the criteria may be timing criteria. For instance, when the user provides a reposition command to move spout 108 to begin filling in the area of void 130, the control system may move spout 108 to fill in that area for a predetermined amount of time (such as 10 seconds, etc.). After that time has elapsed, then the control system may move spout 108 to resume filling trailer 122 at the previous location. In another example, the criteria may be fill level or threshold criteria. For instance, where the image processing system detects how full trailer 122 is at different locations, then spout 108 may be repositioned to fill the area of void 130 until the fill level in the area of void 130 reaches a threshold fill level. In another example, where the fill level is already at the threshold level prior to repositioning spout 108, the threshold levels may be increased so that the trailer 122 in the area of void 130 can be filled with more material 110.

It should also be noted that, in one example, forage harvester 100 may have an automatic fill control system (or active fill control system) which fills trailer 122 according to a fill strategy (such as a back-to-front fill strategy, front-to-back fill strategy, etc.). In that case, a current location indicator (such as indicator 132) may be displayed to show the current location where material 110 is being loaded into trailer 122 through spout 108 and the direction that spout 108 will be moving relative to trailer 122 as the filling operation continues. It can be seen in FIG. 3, for instance, that indicator 132 is an arrow pointing in the front-to-back direction. The location of arrow 132 on the representation of trailer 122 indicates the current fill position, while the direction of the arrow indicates the direction that spout 108 will be moved relative to trailer 122 in executing the selected front-to-back fill strategy. Therefore, in one example, when the operator taps the display screen in, or otherwise selects, the area of trailer 122 corresponding to void 130, the indicator 132 remains in place to indicate the location to which spout 108 will return after it temporarily fills the area of trailer 122 corresponding to void 130. These are just some examples of how the operator interface display 124 can be generated.

In another example, as is discussed in greater detail elsewhere, the operator may also select an active fill strategy using a touch gesture. For instance, at the beginning of a fill operation, or at any time during the fill operation, the operator may touch the representation of trailer 122 on display 124 and swipe in one direction or the other or provide another touch gesture. By way of example, assume that the operator touches the rear portion of trailer 122 and swipes forward toward the front portion of trailer 122. In that case, the system can detect that touch gesture and interpret it as selecting a back-to-front fill strategy. The control system then begins filling the trailer toward the rear of the trailer and continues to fill the trailer moving toward the front of the trailer.

Figure 4:
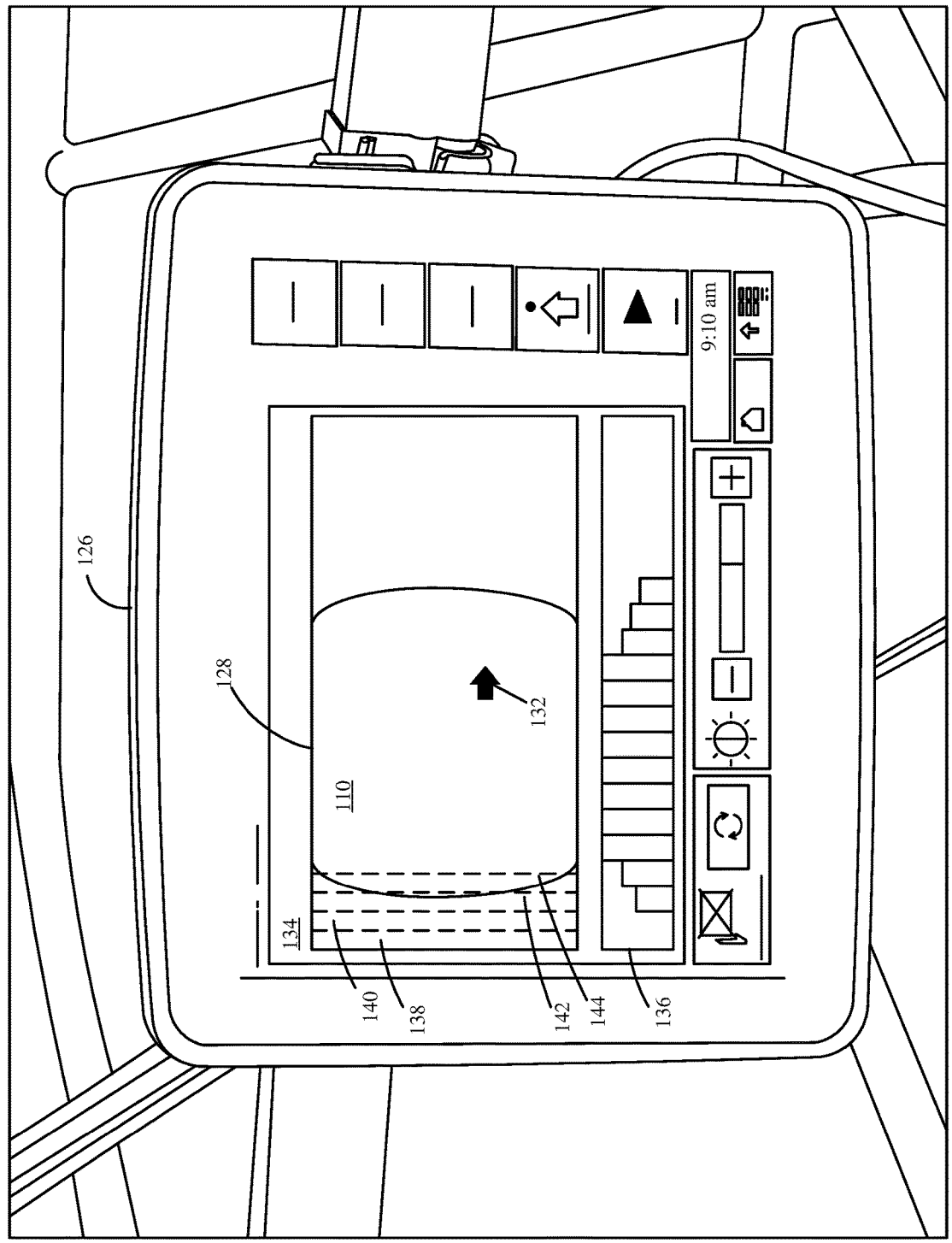
FIG. 4 is a pictorial illustration of an operator display showing a top down representation of a receiving vessel and a graphical illustration of a fill level in the receiving vessel.

FIG. 4 is another example of an operator interface display 134 which can be generated for the operator of harvester 100. Some items are similar to those shown in FIG. 3 and they are similarly numbered. Display 134 is a representation of a top-down view of trailer 122. The top-down view is accompanied by a graph 136 that illustrates the fill level of the different portions of trailer 128. By way of example, image processing can divide the area of the trailer 128 into bins or discrete volumes (some of which are illustrated by the dashed lines in FIG. 4). FIG. 4 shows that the bins 138, 140, 142, and 144 correspond to volumes defined by a cross section of the trailer 128. Each of the bins has a corresponding bar graph in graph 136, indicating the fill level of that bin in trailer 128. The bar graphs corresponding to bins 138 and 140 are at zero showing that there is no material 110 at those locations in trailer 128. The bar graphs corresponding to bins 142 and 144 show increasing levels of material 110 in those bins. The location of the bins may be displayed on display 134, or they may be hidden.

In the example shown in FIG. 4, the operator may see that the location of trailer 128 corresponding to bins 138 and 140 is empty. In that case, the operator may provide a reposition command input (such as tapping or touching the display 134 in the area of bin 138 or 140) to indicate that the operator desires to have the spout 108 repositioned to a location which fills the volume corresponding to the selected bin in trailer 122. For instance, assume that the operator taps the display 124 in the area of bin 138. In that case, the control system automatically repositions the spout 108 from the position illustrated by indicator 132 to the position of bin 138, and begins filling at that position. Where an automatic fill control system is executing a fill strategy, then the automatic fill strategy can be temporarily suspended, and trailer 122 may be filled in the location of bin 138 until some resume criteria are met, at which point the spout 108 is controlled to resume filling at the location of indicator 132, and the selected fill strategy is re-activated. Where the harvester 100 does not have an automatic fill control system or where an automatic fill control strategy is not being implemented, then the harvester 100 may continue to fill the area of trailer 122 corresponding to bin 138 until the operator enters another command (such as by tapping an area of display 124 corresponding to another bin), or tapping indicator 132. In either case, once the operator enters a command (such as by tapping the location of a bin on the display 124 or by tapping indicator 132) the control system translates that pixel location into a physical bin location on trailer 122 and moves the spout 108 so that it begins filling the trailer at that bin location.

Again, as with the display shown in FIG. 3, the operator may use a touch gesture (such as a touch and swipe touch gesture) to indicate a desired active fill strategy. The control system can interpret the touch gesture to identify the fill strategy and begin implementing that fill strategy.

Figure 5:
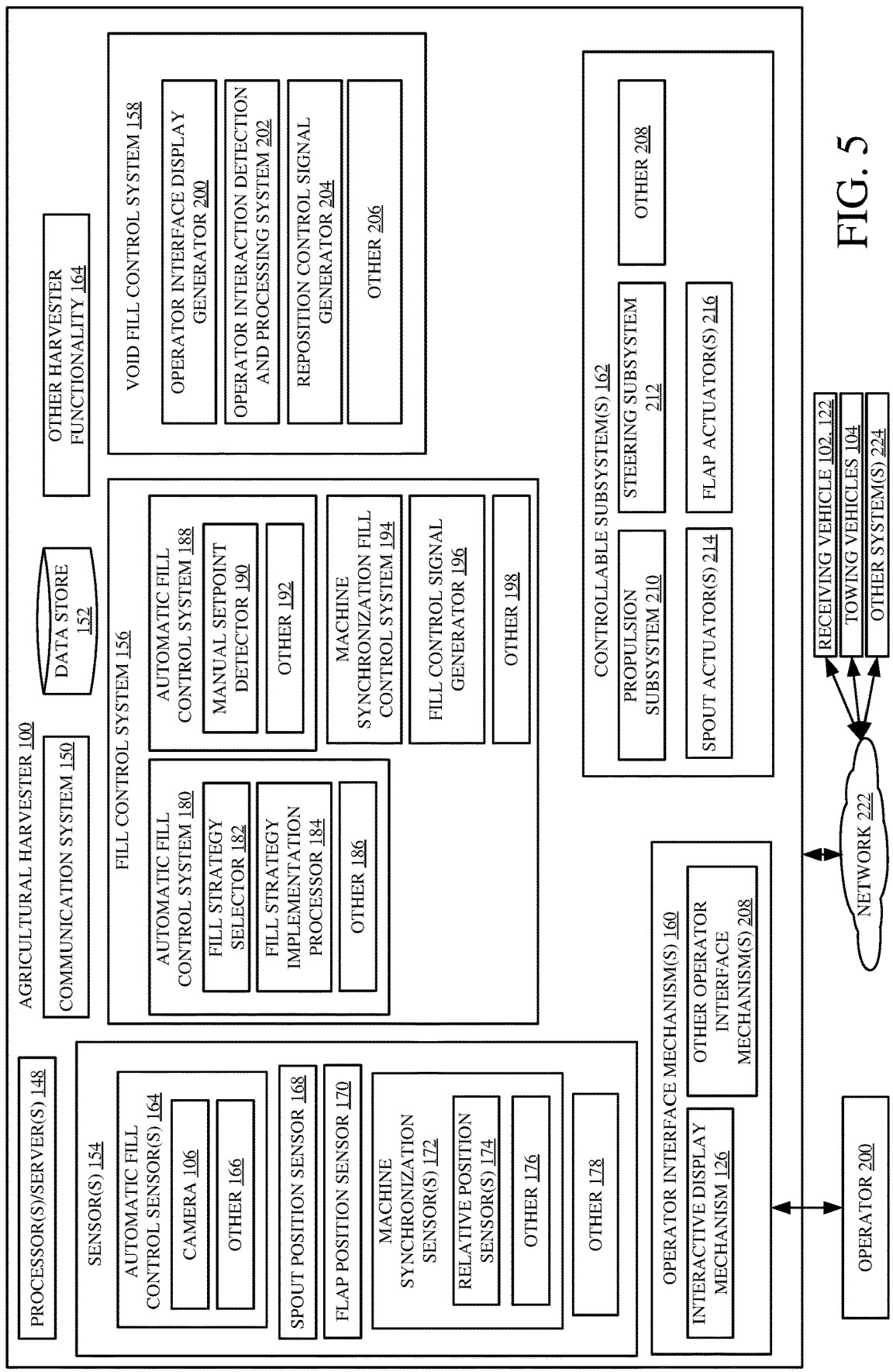
FIG. 5 is a block diagram of one example of a harvester.

FIG. 5 is a block diagram showing one example of a mobile work machine which comprises agricultural harvester 100, in more detail. Agricultural harvester 100, in the example shown in FIG. 5, includes one or more processors or servers 148, communication system 150, data store 152, sensors 154, fill control system 156, void fill control system 158, operator interface mechanisms 160, controllable subsystems 162, and other harvester functionality 164. Sensors 154 can include automatic fill control sensors 164 that are used by fill control system 156. Sensors 164 can include camera 106 (which may be a mono-camera, stereo-camera or another type of camera) and other sensors 166. The other sensors can include such things as Doppler sensors, RADAR sensors, other image sensors or any of a wide variety of other types of sensors. Sensors 154 can also include spout position sensor 168 and flap position sensor 170. Spout position sensor 168 illustratively senses the position of spout 108 relative to the frame of harvester 100. Sensor 168 can do this by sensing the position of an actuator that drives movement of spout 108 relative to the frame of harvester 100, or sensor 168 can be a rotary position sensor, a linear sensor, a potentiometer, a Hall Effect sensor, or any other of a wide variety of sensors that can sense the position of spout 108 relative to the frame of harvester 100. Similarly, flap position sensor 170 can be a sensor that senses the position of the flap 109. Thus, sensor 170 can be a rotary position sensor, a linear sensor, a potentiometer, a Hall Effect sensor, a sensor that senses a position of an actuator that drives movement of flap 109, or any of a wide variety of other sensors.

Sensors 154 can also include machine synchronization sensors 172. Sensors 172 can include relative position sensors 174 that sense the relative position of the harvester, relative to the receiving vehicle. Such sensors can include RADAR sensors, Doppler sensors, image or other optical sensors, or a wide variety of other relative position sensors. The relative position sensors 174 can also include position sensors (such as a GPS receiver, or another GNSS sensor) that senses the position of harvester 100. This can be used, in conjunction with another position sensor on the receiving vehicle, to determine the position of the two vehicles relative to one another. The machine synchronization sensors 172 can include other sensors 176, and sensors 154 can include a wide variety of other sensors 178 as well.

Fill control system 156 illustratively controls operations of various parts of harvester 100 (and possibly the towing vehicle 104) to fill the receiving vehicle 102, 122, as desired. Fill control system 156 can include automatic fill control system 180 (which, itself, can include fill strategy selector 182, fill strategy implementation processor 184 and other items 186), manual fill control system 188 (which, itself can include manual set point detector 190 and other items 192), and/or machine synchronization fill control system 194. Fill control system 156 can also include fill control signal generator 196 and other items 198. Void fill control system 158 can include operator interface display generator 200, operator interaction detection and processing system 202, position control signal generator 204 and other items 206. Operator interface mechanisms 160 can include interactive display mechanism 126 and a variety of other operator interface mechanisms 208. Controllable subsystems 162 can include propulsion subsystem 210, steering subsystem 212, one or more spout actuators 214, one or more flap actuators 216 and other items 218. FIG. 5 also shows that operator 220 can interact through operator interface mechanism 160 to control and manipulate agricultural harvester 100. Further, FIG. 5 shows that harvester 122 is connected over network 222 to receiving vehicle 102, 122, towing vehicle 104 and/or it can be connected to other systems 224. Before describing the overall operation of agricultural harvester 100 in more detail, a brief description of some of the items in agricultural harvester 100, and their operation, will first be provided.

Communication system 150 can facilitate communication among the items of harvester 100 and with other items over network 222. Network 222 can be a wide area network, a local area network, a near field communication network, a cellular communication network, or any of a variety of other networks or combinations of networks. Therefore, communication system 150 can use a controller area network (CAN) bus or other controllers to facilitate communication of the items on harvester 100 with other items. Communication on system 150 can also be different kinds of communication systems, depending on the particular network or networks 222 over which communication is to be made.

Operator interface mechanisms 160 can be a wide variety of different types of mechanisms. Interactive display mechanism 126 can be a display mechanism, such as that shown in FIGS. 3 and 4, or mechanism 126 can be a display mechanism on a mobile device, such as a tablet computer, a smartphone, etc., that is carried by the operator 200 and/or mounted in the operator compartment of harvester 100. Thus, interactive display mechanism 126 can be a touch sensitive display mechanism, a display mechanism that receives inputs through a point and click device, or other kinds of display mechanisms.

Other operator interface mechanisms 208 can include a steering wheel, levers, buttons, pedals, a microphone and speaker (where speech recognition and speech synthesis are provided), joysticks, or other mechanical, audio, visual or haptic mechanisms that can be used to provide outputs to operator 220 or to receive inputs from operator 220.

Controllable subsystems 162 can be controlled by various different items on harvester 100. Propulsion subsystem 210 can be an engine that drives ground-engaging elements (such as wheels or tracks) through a transmission, hydraulic motors that are used to drive ground-engaging elements, electric motors, direct drive motors, or other propulsion systems that are used to drive ground-engaging elements to propel harvester 100 in the forward and rearward directions. Propulsion subsystem 110 can illustratively be controlled with a throttle to increase or decrease the speed of travel of harvester 100.

Steering subsystem 212 can be used to control the heading of harvester 100. One or more spout actuators 214 are illustratively configured to drive rotation or movement of spout 108 relative to the frame of harvester 100. Actuators 214 can be hydraulic actuators, electric actuators, pneumatic actuators, or any of a wide variety of other actuators. Similarly, one or more flap actuators 216 are used to drive the position of flap 109 relative to spout 108. The flap actuators 216 can also be hydraulic actuators, electric actuators, pneumatic actuators, or any of a wide variety of other actuators.

Fill control system 156 can use automatic fill control system 180 to perform automated fill control to automatically execute a fill strategy in filling one of the receiving vehicles 102, 122. Therefore, fill strategy selector 182 can detect a user input selecting a fill strategy, or another input selecting a fill strategy and access data store 152 for a stored fill algorithm that can be executed to perform the selected fill strategy. For instance, where the selected fill strategy is a back-to-front strategy, the algorithm will direct filling of the receiving vehicle beginning at the back of the receiving vehicle and moving to the front of the receiving vehicle. Other fill strategies can be selected as well. Fill strategy implementation processor 184 receives inputs from the automatic fill control sensors 164, spout position sensor 168 and flap position sensor 170 and generates an output to fill control signal generator 196 based upon the inputs from the sensors, to execute the desired automatic fill control strategy. Fill control signal generator 196 can generate control signals to control any of the controllable subsystems 262 (or other items) to execute the fill strategy being implemented by fill strategy implementation processor 184.

Manual fill control system 188 can use manual set point detector 190 to detect a manual input from operator 220 (e.g., through interactive display mechanism 126) to identify a landing point in the receiving vehicle 102, 122 where the operator 220 desires the filling operation to be performed. Manual fill control system 188 can then generate outputs to fill control signal generator 196 which generates control signals to control the controllable subsystems 162 so that filling commences at the manually identified landing point in the receiving vehicle 102, 122.

Machine synchronization fill control system 194 can receive operator inputs or other inputs, as well as sensor inputs from sensors 154 to generate outputs to fill control signal generator 196 in order to synchronize the positions of agricultural harvester 100 and receiving vehicle 102, 122 so that a desired filling operation is performed. For instance, machine synchronization control system 194 can receive sensor inputs identifying that the current position that is being filled in receiving vehicle 102, 122, is at a desired fill level so that the receiving vehicle should move forward or rearward relative to agricultural harvester 100. Machine synchronization fill control system 194 then generates an output to fill control signal generator 196 indicating this. Fill control signal generator 196 can generate an output either to controllable subsystems 162, or communication system 150, or both, based on the inputs from machine synchronization fill control system 194. For instance, where the output from system 194 indicates that the receiving vehicle 102, 122 should move forward relative to agricultural harvester 100, then fill control signal generator 196 can control communication system 150 to communicate with a corresponding machine synchronization fill control system 194 on towing vehicle 104 indicating that towing vehicle 104 should "nudge" forward relative to the harvester 100 by momentarily increasing its ground speed and then returning to its current ground speed. Alternatively, or in addition, fill control signal generator 196 can generate control signals to control the propulsion subsystem 210 on agricultural harvester 100 to momentarily change the speed of agricultural harvester 100 so that the position of the receiving vehicle 102, 122 relative to agricultural harvester 100 changes as desired.

Void fill control system 158 can use operator interface display generator 200 to generate an operator interface display indicative of the receiving vessel 102, 122 and the amount of material in the receiving vessel 102, 122. The operator interface display may be similar to one of the displays shown in FIGS. 3 and 4 or different. Operator interaction detection and processing system 202 can detect operator inputs through the interface display that was generated by generator 200 and displayed on interactive display mechanism 126. The operator input may be a reposition command input that illustratively identifies a selected landing point in receiving vehicle 102, 122 to which the operator wishes to reposition the filling operation, at least temporarily. Operator interaction detection and processing system 202 then translates the landing point selected by operator 220 on interactive display mechanism 126 to a landing point in receiving vehicle 102, 122 that is to be filled. Processing system 202 identifies the actions needed to be taken in order to begin filling at that landing point.

For instance, system 202 can identify the spout and flap angles that are needed in order to commence filling at the selected landing point in receiving vehicle 102, 122. System 202 can output those angles to position control signal generator 204 which can then generate control signals to control spout actuators 214 and flap actuators 216 to commence the fill operation at the selected location. At the same time, system 202 can provide an output to fill control system 156 temporarily suspending fill control system 156 from controlling the fill operation. For instance, if the automatic fill control system 180 is executing an automatic fill strategy, then the signal from system 202 can temporarily suspend system 180 from executing that fill strategy until criteria are met at which point system 180 can resume that fill strategy. Similarly, if manual fill control system 188 is controlling the fill operation to fill at a previously selected manual landing point, then the signal from system 180 can temporarily suspend system 188 from maintaining the fill operation at that previously selected landing point, and allow position control signal generator 204 to reposition the spout and flap to commence filling at the newly selected landing point.

Also, where machine synchronization fill control system 194 is being used, the signal from system 202 can cause system 194 to generate output signals to move the filling operation to the operator-selected landing point in receiving vehicle 102, 122, until criteria are met. Alternatively, the signal from system 202 can cause machine synchronization fill control system 194 to suspend its control operation and allow position control signal generator 204 to control the propulsion subsystem 210 and/or steering subsystem 212 to change the relative position of harvester 100 and receiving vehicle 102, 122 (to reposition the spout relative to the receiving vehicle based on the reposition command input) so that the filling operation commences at the operator-selected landing point.

Figure 6:
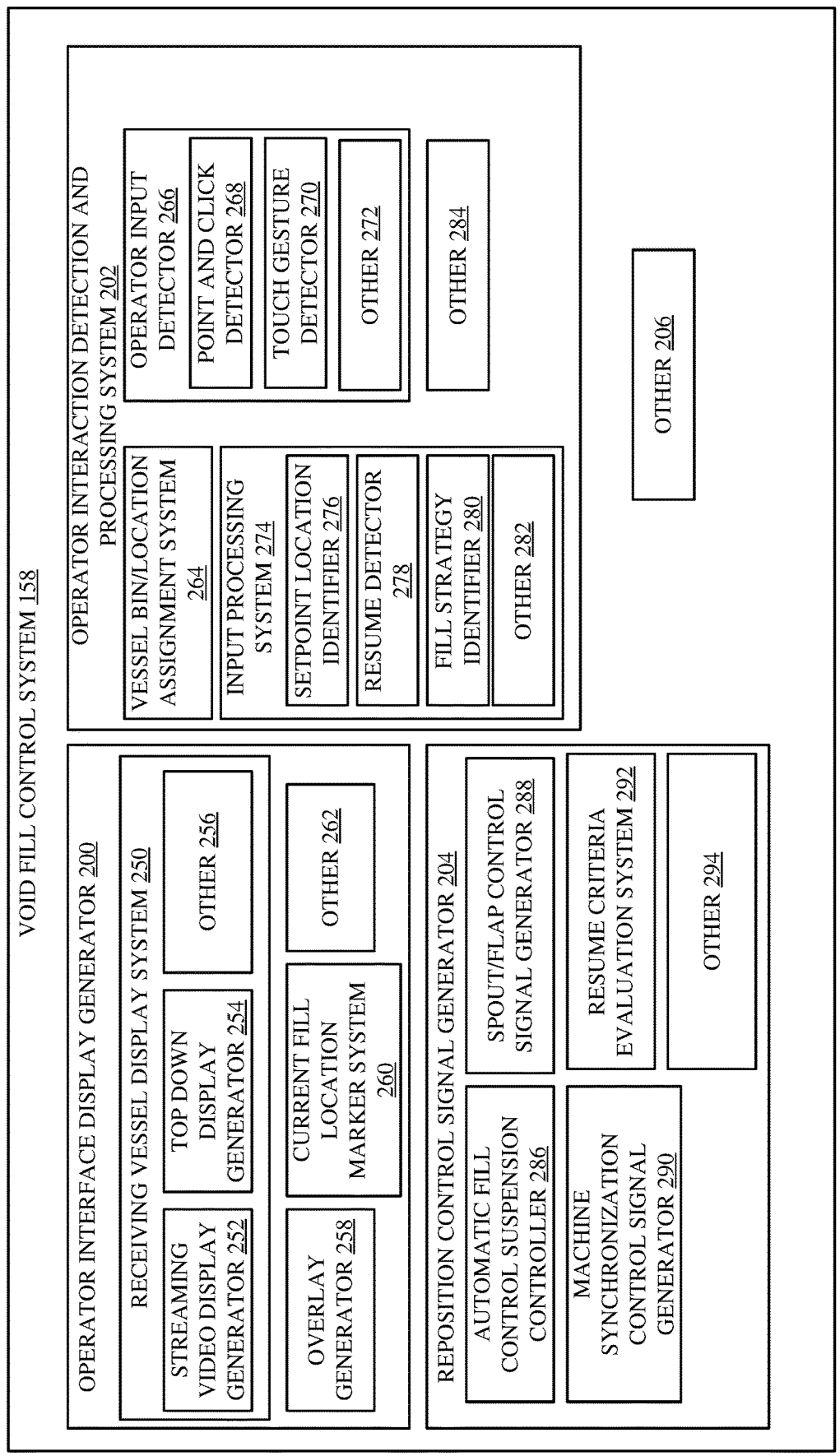
FIG. 6 is a block diagram of one example of a void fill control system.

FIG. 6 is a flow diagram illustrating one example of void fill control system 158, in more detail. Some of the items in FIG. 6 are similar to those shown in FIG. 5, and they are similarly numbered. However, FIG. 6 shows one example of operator interface display generator 200, operator interaction detection and processing system 202, and reposition control signal generator 204, in more detail. Before describing the operation of void fill control system 158 in more detail, some of the items in system 158, and their operation, will first be provided. Operator interface display generator 200 illustratively includes receiving vehicle display system 250 (which, itself, can include streaming video display generator 252, top-down display generator 254, and other items 256), overlay generator 258, current fill location marker system 260, and other items 262. Operator interaction detection and processing system 202 can include vessel bin/location assignment system 264, operator input detector 266 (which, itself, can include point and click detector 268, touch gesture detector 270, and other items 272), input processing system 274 (which, itself, can include set point location identifier 276, resume detector 278, fill strategy identifier 280, and other items 282), and other items 284. Reposition control signal generator 284 can include automatic fill control suspension signal controller 286, spout/flap control signal generator 288, machine synchronization control signal generator 290, resume criteria evaluation system 292, and other items 294.

Receiving vessel display system 250 generates an operator display that represents the receiving vessel, and a fill level of material that the harvester is transferring to the receiving vessel. Streaming video display generator 252 generates a streaming video display based on video information captured by camera 106. Top-down display generator 254 can generate a top-down representation of the receiving vessel 103, such as that shown in FIG. 4. The top-down display can be a pictorial illustration or it can be generated in other ways. In addition, top-down display generator 254 can generate the fill level display portion 136, or another display portion that shows the fill level of material 110 in the receiving vessel.

Overlay generator 258 can generate one or more different types of overlays. For instance, overlay generator 258 can generate an overlay that visually distinguishes the perimeter of the receiving vessel 103, or the opening 128 of the receiving vessel 103 so that the opening can be quickly identified, visually, by the operator. Overlay generator 258 can also generate other overlay display elements, such as the bin display elements shown as dashed lines in FIG. 4 (which can also be depicted in FIG. 3) and other overlays.

Current fill location marker system 260 generates the current fill location (such as marker 132 shown in FIGS. 3 and 4) that indicates the current fill position, or the landing point where spout 108 is currently depositing material into the receiving vessel 103. In one example, the current fill location marker can be an arrow or other directional marker that identifies the direction which spout 108 is moving relative to the receiving vessel 103, during the filling operation.

Operator interaction detection and processing system 202 detects information indicative of operator interactions with the operator interface display, and processes those interactions. Vessel bin/location assignment system 264 first performs image processing on the captured images to identify the receiving vessel 103 in the captured images. It then divides the receiving vessel 103 into a number of discrete bins or locations which correspond to consecutive volumes in the receiving vessel 103. For instance, system 264 can analyze the image or representation shown in FIG. 4 and divide that image or representation into different bins, some of which are shown as bins 138-144 in FIG. 4. The same can be done with respect to the image illustrated in FIG. 3.

Operator input detector 266 then detects any operator inputs or interactions with the operator interface display. Point and click detector 268 can detect a point and click input on the operator interface display. Touch gesture detector 270 detects touch gestures on the operator interface display.

Input processing system 274 processes the detected operator inputs to identify an operator intent or an operator command corresponding to the detected input. Set point location identifier 276 can receive an indication of the detected operator input from operator input detector 266 and determine that the operator input is identifying a reposition command. The reposition command identifies a set point position (or landing point) indicating that the operator wishes the spout to be repositioned to commence filling at the commanded landing point in the receiving vessel 103. For instance, assume that the operator taps on a pixel within the displayed representation of bin 138 in FIG. 4. In that case, set point location identifier 276 can access a correlation between the pixel where the tap was detected and the bin 138. Set point location identifier 276 can then generate an output indicating that the user has commanded the filling operation to reposition the spout 108 so that it commences filling bin 138 in receiving vessel 103.

Resume detector 178 can detect criteria indicating that the fill control system should resume controlling the fill operation as it was doing prior to the detected operator reposition command. For instance, continuing with the example discussed above, assume that the operator has tapped on a location corresponding to bin 138 in FIG. 4. Again, assume that the void fill control system 158 or fill control system 156 has, in response, repositioned the spout 108 so it commences filling bin 138. At some point, the fill control system 156 detects that the material 110 has reached a desired fill level in bin 138. This can be done by analyzing the captured image to identify the fill level of material 110 in bin 138. This information is provided to resume detector 278 which detects that the resume criteria have been met so that filling automatically resumes at its prior landing point (prior to receiving the user reposition command) and the control signals are generated to move the spout 108 so that filling resumes at that previous landing point. In another example, resume detector 278 may detect other resume criteria. For instance, it may be that the operator again taps on location indicator 132. This will be detected by touch gesture detector 270 and an indication of this will be provided to resume detector 278. Resume detector 278 may interpret this input command as a command by the operator to resume filling at the prior landing point (the landing point prior to receiving the reposition command). Other resume criteria may be detected by resume detector 278 as well.

In another example, operator 220 may select the fill strategy using a touch gesture on the operator interface display. For instance, when a filling operation is about to commence, the operator may touch and swipe on the depiction of the receiving vessel, depicted on the operator interface display. The location of the touch, and the direction of the swipe, may be used by fill strategy identifier 280 to identify a fill strategy that is to be employed during the filling operation. For instance, if the operator touches the back portion of the receiving vessel and swipes in a forward direction, then this may be interpreted by fill strategy identifier 280 as identifying a back-to-front fill strategy. Thus, fill strategy identifier 280 may output an indication of this to fill strategy selector 182 in fill control system 256 so that fill strategy selector 182 selects the back-to-front fill strategy.

The outputs from operation interaction and processing system 202 can be provided to reposition control signal generator 204 which provides output signals to either fill control signal generator 196 or directly to controllable subsystems 162, or both, to implement control for repositioning spout 108 based upon the operator reposition command, and to again resume filling at the prior landing point once resume criteria are detected. As discussed above, it may be that automatic fill control system 180 is implementing an automatic fill strategy (or an active fill strategy) when the operator reposition command is detected. In that case, automatic fill control suspension controller 286 temporarily suspends the automatic fill control strategy so that the spout 108 can be repositioned based on the operator reposition command. Automatic fill control suspension controller 286 enables the automatic fill control strategy again, once the resume criteria are detected.

Spout/flap control signal generator 288 generates control signals to control the spout actuators 214 and flap actuators 216. In one example, generator 288 can calculate the spout and flap angles needed to reposition spout 108 to the commanded landing point and to resume at its prior landing point, and provide those angles to fill control signal generator 196 which, in turn, controls the spout and flap actuators 214 and 216, respectively, to move to the commanded angles. In another example, spout/flap control signal generator 288 can directly provide control signals to actuate spout actuators 214 and flap actuators 216. These and other architectures are contemplated herein.

In an example in which agricultural harvester 100 has machine synchronization fill control system 194, machine synchronization control signal generator 290 generates control signals and provides them to machine synchronization fill control system 194 to reposition the spout 108 relative to the receiving vehicle, based upon the operator reposition command, and to again position spout 108 relative to the receiving vehicle to resume filling at the prior landing point when the resume criteria are met. Thus, when a signal is received from operator interaction detection and processing system 208 indicating that the operator has provided a reposition command, then machine synchronization control signal generator 298 provides control signals to machine synchronization fill control system 194 to reposition spout 108, relative to the receiving vehicle, to commence filling at the landing point indicated by the reposition command. When the fill operation is to resume at its prior landing point (e.g., when resume criteria have been detected), then machine synchronization control signal generator 290 provides control signals to machine synchronization fill control system 194 to move the position of spout 108, relative to the receiving vehicle, back to the position it was in prior to receiving the reposition command.

Resume criteria evaluation system 292 can evaluate the resume criteria detected by resume detector 278 to determine if and when to resume filling at the prior landing point in the receiving vehicle. For instance, if resume detector 278 detects that the fill level is within 10% of a threshold value, then resume criteria evaluation system 292 may determine when and how quickly to move spout 108 to the prior landing point and resume filling according to a prior active fill strategy. This is just one example of how resume criteria evaluation system 292 can evaluate the resume criteria to resume a prior filling operation.

Figure 7A:
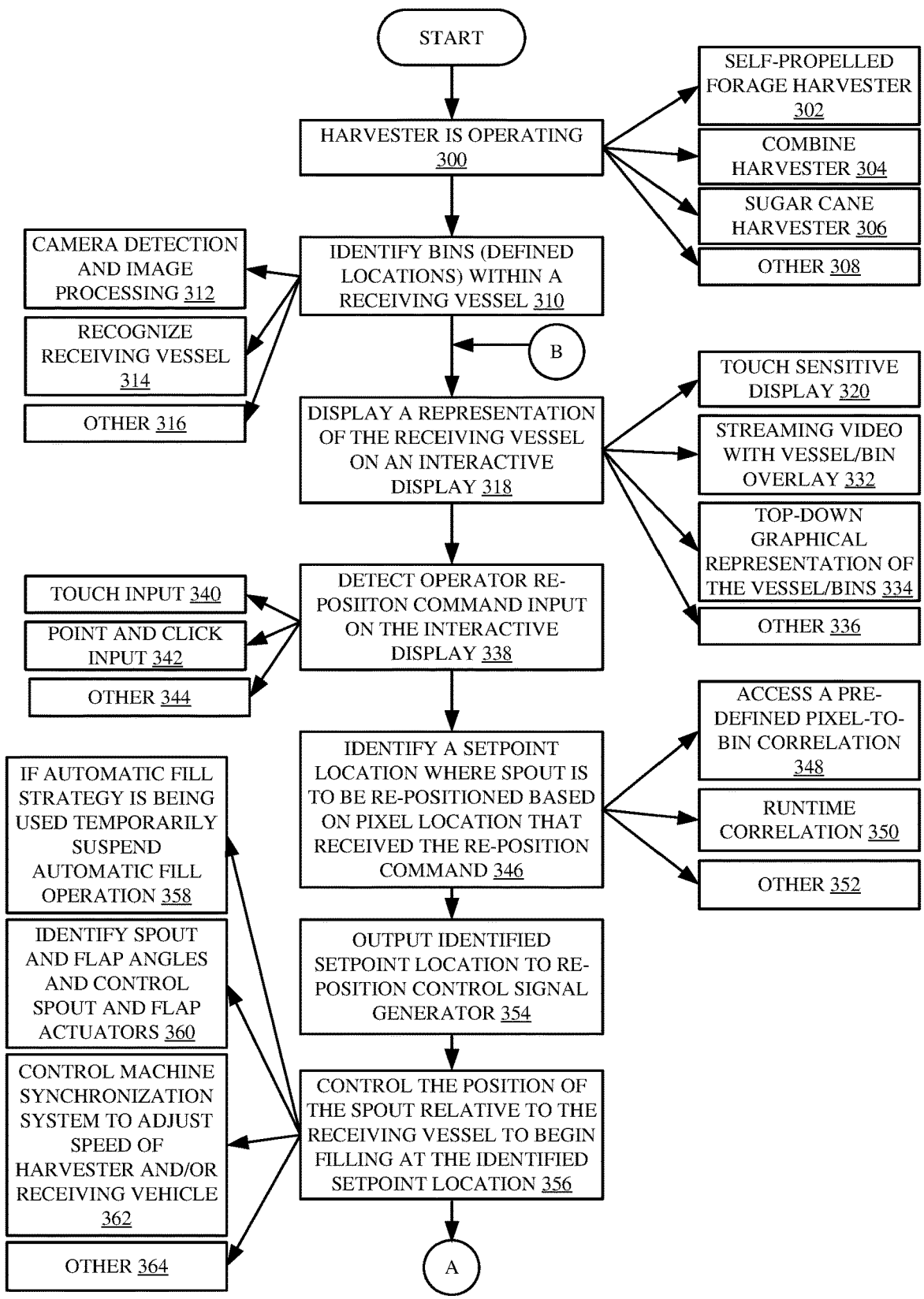
FIGS. 7A and 7B (collectively referred to herein as FIG. 7) show a flow diagram illustrating one example of detecting an operator input and performing control of a fill operation to fill a receiving vehicle.
Figure 7B:
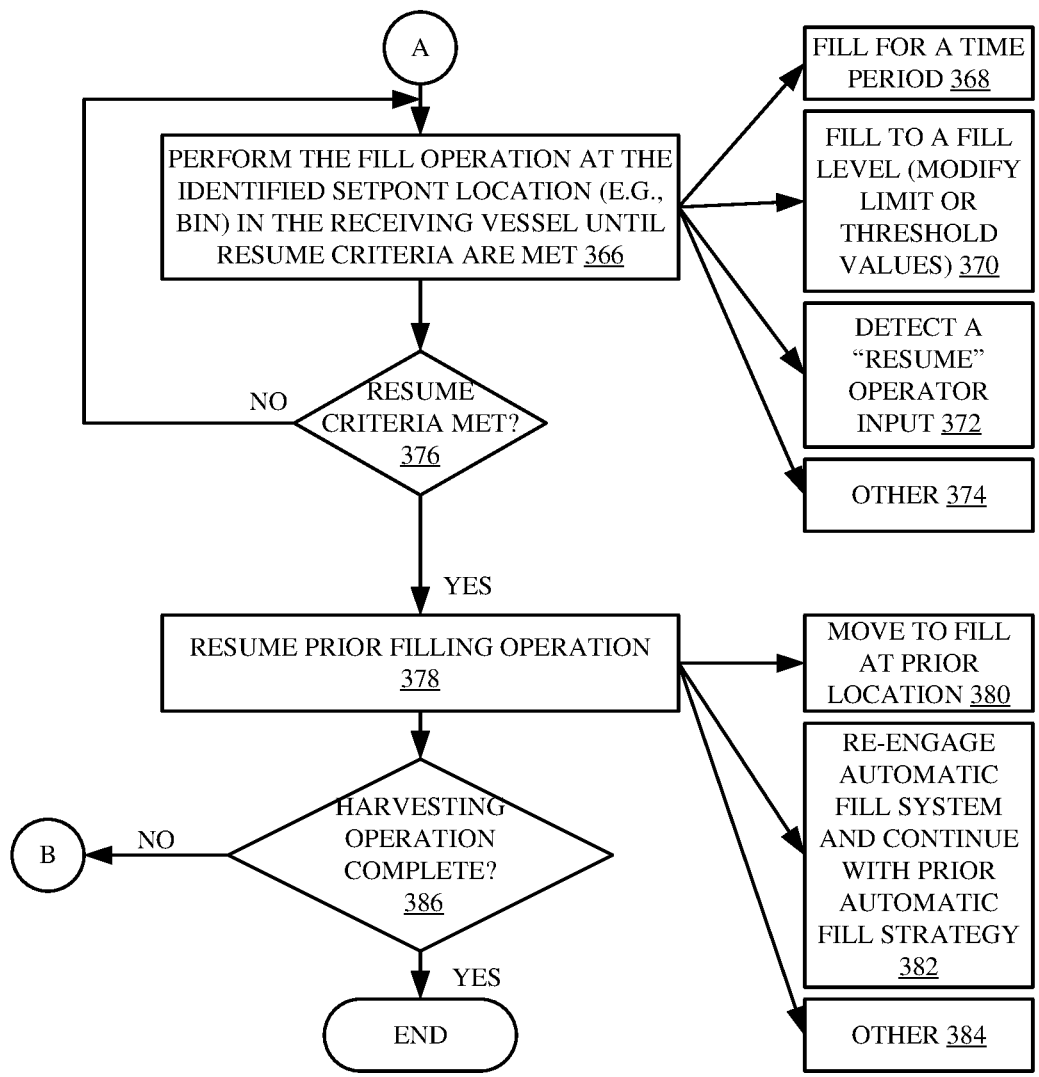

FIGS. 7A and 7B (collectively referred to herein as FIG. 7) show a flow diagram illustrating one example of the operation of agricultural harvester 100 in beginning a fill operation, detecting an operator reposition input, repositioning the location of spout 108 relative to the receiving vehicle based upon the operator reposition input, detecting resume criteria, and resuming the prior fill operation. It is first assumed that harvester 100 is beginning a harvesting operation, or that the harvester is operating, as indicated by block 300 in the flow diagram of FIG. 7. As discussed above, agricultural harvester 100 may be a self-propelled forage harvester 302, a combine harvester 304, a sugarcane harvester 306 or another harvester 308.

Camera 106 can capture images (such as video or other images) of the receiving vessel and vessel bin/location assignment system 264 processes those images and identifies discrete locations or bins in the receiving vessel. Identifying bins or defining discrete locations within the receiving vessel is indicated by block 310. As discussed above, system 264 can divide the receiving vessel into bins by processing images captured by camera 106, as indicated by block 312. In another example, system 264 can identify a type of receiving vessel (such as a type of wagon) and then access the dimensions of that receiving vessel from memory or from other predetermined data. System 264 can then divide the receiving vessel into a desired number of bins based on the dimensions. In yet another example, each vessel type is already assigned a number and configuration of different bins so that all system 264 needs to do is identify the type of receiving vessel or receiving vehicle and then access the known bin configuration for that receiving vessel. Recognizing the receiving vessel to identify and assign bins is indicated by block 314. Dividing the receiving vessel into a number of discrete locations or bins can be done in other ways as well, as indicated by block 316.

Operator interface display generator 200 displays a representation of the receiving vehicle on an interactive display device 126. Displaying the representation of the receiving vehicle is indicated by block 318 in the flow diagram of FIG. 7. In one example, the representation can be displayed on a touch sensitive display device as indicated by block 320. The representation can be a streaming video with the vessel opening and the bins overlaid on top of the images, as indicated by block 332. In another example, the representation is a top-down graphical or pictorial representation of the vessel and it may also have the bins displayed thereon, as indicated by block 334. The representation of the receiving vessel can be displayed on an interactive display in other ways as well, as indicated by block 336.

Operator interaction detection and processing system 202 then detects an operator reposition command input on the interactive display, as indication be block 338. As discussed above, the operator reposition command can be a touch input 340, a point and click input 342, or another type of input 344 on the representation of the receiving vessel on the interactive display.

Input processing system 274 then identifies a location where the spout 108 is to be repositioned based upon the pixel location on the interactive display that received the reposition command from the operator. Identifying a location where the spout 108 is to be repositioned based upon the reposition command input is indicated by block 346 in the flow diagram of FIG. 7. This can be done in a variety of different ways. For instance, set point location identifier 276 can access a pre-defined pixel-to-bin correlation which correlates the assigned bins in the receiving vessel to the different pixel locations on the image. Then, by identifying the particular pixel or set of pixels that receive the reposition command input from the operator, the correlation outputs the corresponding bin in the receiving vessel. Accessing a pre-defined pixel-to-bin correlation is indicated by block 348 in the flow diagram of FIG. 7. In another example, set point location identifier 276 makes a runtime correlation. By way of example, the location of the receiving vessel within the image being processed may change over time. Therefore, the correlation between a particular pixel on the display device and a bin assigned to the receiving vessel may also change over time. Thus, in one example, a real-time (or near real time) correlation between the pixels on the displayed representation of the receiving vessel and the bins in the receiving vessel is generated and that real-time correlation is used to identify the location within the receiving vessel that the user has commanded with the reposition command. Using a runtime correlation to identify where to reposition the spout 108, relative to the receiving vessel 103, based upon the reposition command is indicated by block 350 in the flow diagram of FIG. 7.

Set point location identifier 276 can identify a landing point where the spout 108 is to be repositioned based upon the pixel location that received the reposition command in other ways as well, as indicated by block 352.

Set point location identifier 276 then outputs the identified set point location (or commanded landing point) to reposition control signal generator 204, as indicated by block 354 in the flow diagram of FIG. 7. Signal generator 204 generates output signals to control the position of the spout 108 relative to the receiving vessel 103 to begin filling at the identified landing point location, as indicated by block 356 in the flow diagram of FIG. 7. If an automatic fill strategy is being used, it is temporarily suspended by automatic fill control suspension controller 286. Temporarily suspending an automatic fill strategy is indicated by block 358 in the flow diagram of FIG. 7.

Spout/flap control signal generator 288 can generate control signals to control the spout and flap actuators based upon the set point location (or landing point) in the reposition command, as indicated by block 360. Where machine synchronization fill control system 194 is being used, then machine synchronization control signal generator 290 can generate outputs to system 194 to reposition the spout relative to the receiving vessel 103, as indicated by block 362. Signal generator 204 can generate control signals to control the position of the spout (and/or flap) relative to the receiving vessel 103 to begin filling at the identified landing point in other ways as well, as indicated by block 364.

Void fill control system 158 and/or fill control system 156 then perform the fill operation at the identified landing point (e.g., in the identified bin) in the receiving vessel 103 until resume criteria are met, as indicated by block 366 in the flow diagram of FIG. 7. The resume criteria may be the elapse of a predetermined time period (such as 10 seconds) as indicated by block 368. The resume criteria may be fill level criteria which are used to identify when sufficient material 110 has been filled at the landing point, as indicated by block 370. The fill level may be identified using threshold values, fill level ranges, or other criteria. The resume criteria may include receiving a "resume input" from the operator, through the interactive display, as indicated by block 372. The resume criteria may be other criteria 374 as well.

At some point, resume detector 278 detects the resume criteria and provides them to resume criteria evaluation system 292. Resume criteria evaluation system 292 determines that the resume criteria have been met. Determining whether the resume criteria have been met is indicated by block 376 in the flow diagram of FIG. 7. The output from system 292 is then used by fill control system 156 to resume the prior filling operation, as indicated by block 378. Fill control system 156 then takes over operation and changes the position of spout 108 relative to the receiving vessel 103 to resume filling at the prior landing point, prior to repositioning the spout 108. Adjusting the position of spout 103 relative to receiving vessel 103 to perform the filling operation at the prior landing point is indicated by block 380. If automatic fill control system 180 was performing an automatic fill operation, and if that operation was temporarily suspended, then automatic fill control suspension controller 286 re-engages that automatic fill control system 180 so that it can resume where it left off. Re-engaging the automatic fill control system 180 and continuing with the prior automatic fill strategy is indicated by block 382 in the flow diagram of FIG. 7. Resuming the prior filling operation can be done in other ways as well, as indicated by block 384. Processing then reverts to block 318 where the system continues to display a representation of the receiving vessel 103 on an interactive display mechanism, and waits for another operator reposition command. Continuing this operation until the harvesting operation is complete is indicated by block 386 in the flow diagram of FIG. 7.

Figure 8:
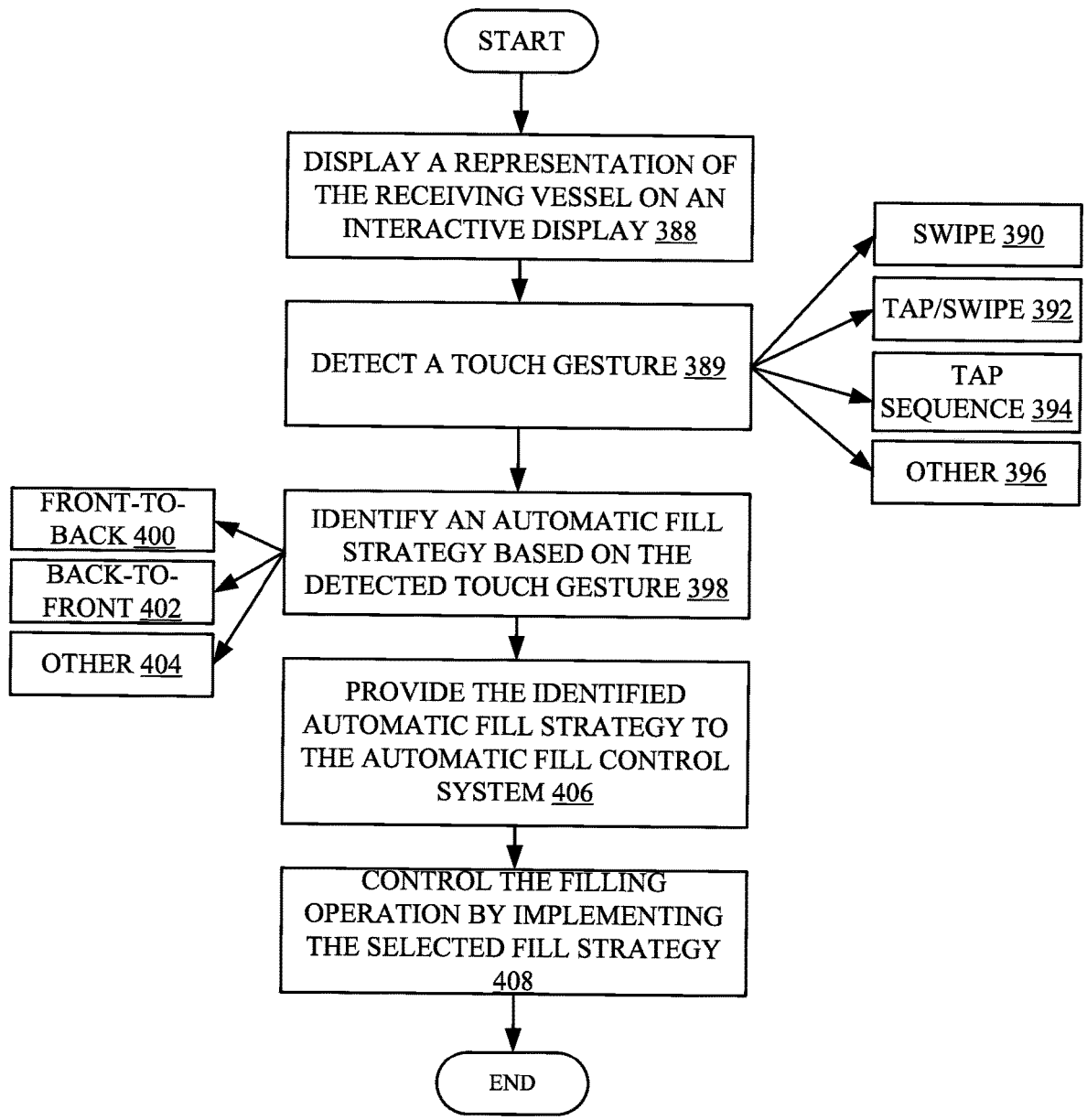
FIG. 8 shows a flow diagram illustrating one example of the operation of detecting an operator touch input and implementing a fill strategy in controlling a filling mechanism, based on the operator touch input.

FIG. 8 is a flow diagram illustrating one example of the operation of agricultural harvester 100 in receiving a touch gesture and selecting an automatic fill strategy based upon that touch gesture. Operator interface display generator 200 displays a representation of the receiving vehicle or receiving vessel on an interactive display mechanism, as indicated by block 388 in the flow diagram of FIG. 8. Touch gesture detector 270 detects a touch gesture on the representation of the receiving vessel, as indicated by block 389. The touch gesture may be a swipe gesture 390, a tap or touch and swipe gesture 392, a sequence of taps 394, or another touch gesture 396.

Fill strategy identifier 280 then detects the touch gesture as an automatic fill strategy selection input and provides an indication of that input to fill strategy selector 182. Identifying an automatic fill strategy based upon the detected touch gesture is indicated by block 398 in the flow diagram of FIG. 8. The fill strategy can be any of a wide variety of different fill strategies such as a front-to-back strategy 400, a back-to-front strategy 402, or another strategy 404. Providing the identified automatic fill strategy to the fill strategy selector in automatic fill control system 180 is indicated by block 406 in the flow diagram of FIG. 8. Fill strategy selector 182 then selects the fill strategy (e.g., loads the fill strategy algorithm for implementing that strategy), from data store 152, or in another way. Fill strategy implementation processor 184 then generates outputs to control signal generator 196 to control the filling operation by implementing the selected fill strategy, as indicated by block 408.

It can thus be seen that the present discussion has proceeded with respect to a system that can quickly reposition the filling operation to fill a different landing point in a filling vessel based upon an operator reposition input on an interactive display mechanism. The filling operation that takes place at the repositioned landing point can be performed by suspending an automatic fill strategy that is currently being implemented and repositioning the filling operation, or by changing a manually set landing point based upon the reposition command. Similarly, the filling operation can take place at the repositioned location temporarily, until resume criteria are met, at which point control can revert to performing the previous filling operation, at the previous landing point in the receiving vessel.

The present discussion has mentioned processors and servers. In one example, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. The interface displays can take a wide variety of different forms and can have a wide variety of different user actuatable input mechanisms disposed thereon. For instance, the user actuatable input mechanisms can be text boxes, check boxes, icons, links, drop-down menus, search boxes, etc. The mechanisms can also be actuated in a wide variety of different ways. For instance, the mechanisms can be actuated using a point and click device (such as a track ball or mouse). The mechanisms can be actuated using hardware buttons, switches, a joystick or keyboard, thumb switches or thumb pads, etc. The mechanisms can also be actuated using a virtual keyboard or other virtual actuators. In addition, where the screen on which they are displayed is a touch sensitive screen, the mechanisms can be actuated using touch gestures. Also, where the device that displays them has speech recognition components, the mechanisms can be actuated using speech commands.

A number of data stores have also been discussed. It will be noted the data stores can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

Figure 9:
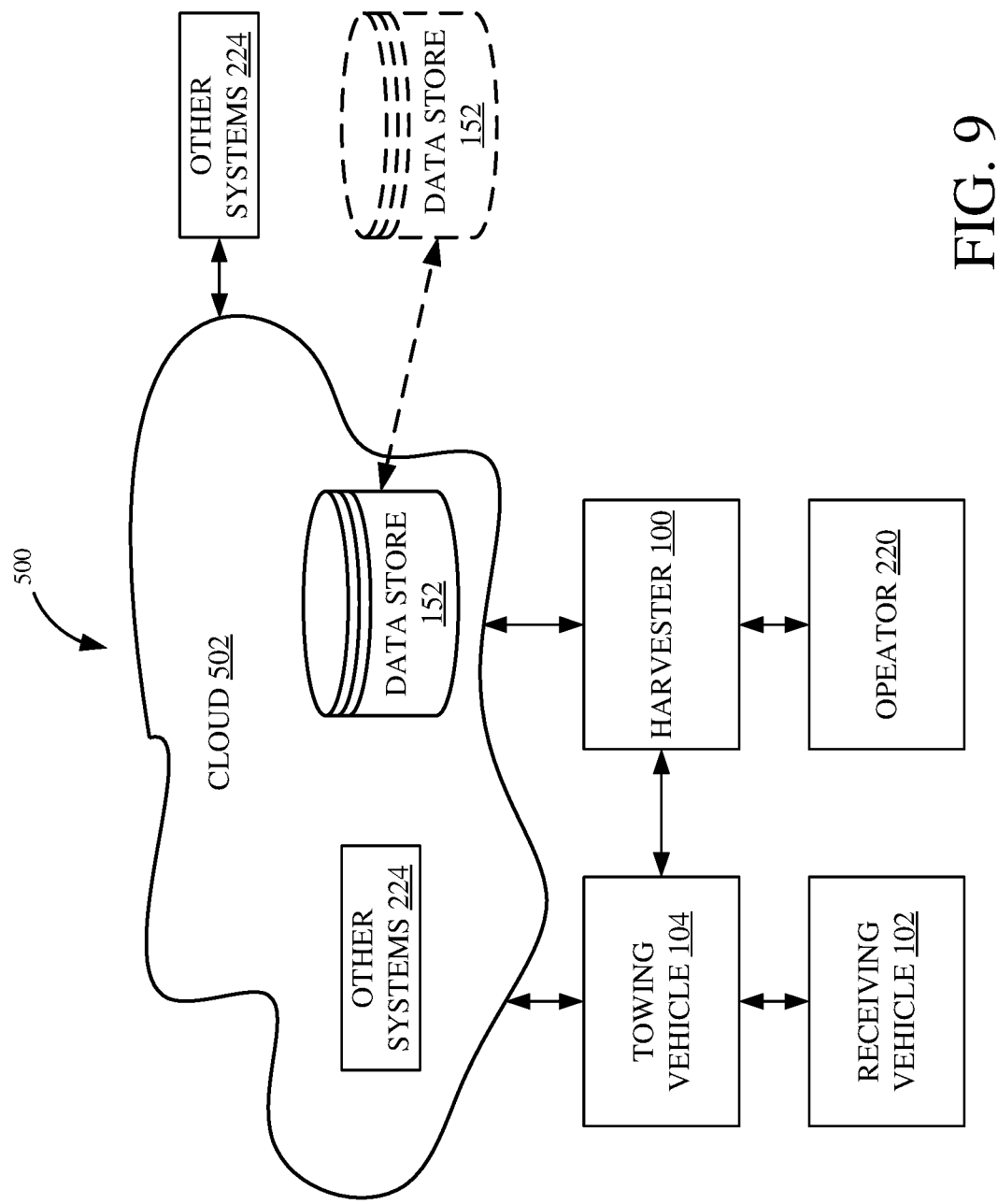
FIG. 9 shows a block diagram of a harvester in a remote server architecture.

FIG. 9 is a block diagram of harvester 100, shown in FIGS. 1-4, except that it communicates with elements in a remote server architecture 500. In an example, remote server architecture 500 can provide computation, software, data access, and storage services that do not require end-user knowledge of the physical location or configuration of the system that delivers the services. In various embodiments, remote servers can deliver the services over a wide area network, such as the internet, using appropriate protocols. For instance, remote servers can deliver applications over a wide area network and they can be accessed through a web browser or any other computing component. Software or components shown in FIGS. 1-4 as well as the corresponding data, can be stored on servers at a remote location. The computing resources in a remote server environment can be consolidated at a remote data center location or they can be dispersed. Remote server infrastructures can deliver services through shared data centers, even though the servers appear as a single point of access for the user. Thus, the components and functions described herein can be provided from a remote server at a remote location using a remote server architecture. Alternatively, the components and functions can be provided from a conventional server, or they can be installed on client devices directly, or in other ways.

In the example shown in FIG. 9, some items are similar to those shown in FIGS. 1-4 and they are similarly numbered. FIG. 9 specifically shows that data store 152, other systems 224, and other parts of the harvester 100 shown in FIG. 4 can be located at a remote server location 502. Therefore, harvester 100 accesses those systems through remote server location 502.

FIG. 9 also depicts another example of a remote server architecture. FIG. 9 shows that it is also contemplated that some elements of FIGS. 1-4 are disposed at remote server location 502 while others are not. By way of example, data store 152 or other systems 224 can be disposed at a location separate from location 502, and accessed through the remote server at location 502. Regardless of where the items are located, the items can be accessed directly by harvester 100, through a network (such as a wide area network or a local area network), the items can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an example, where cell coverage is poor or nonexistent, another mobile machine (such as a fuel truck) can have an automated information collection system. As the harvester 100 comes close to the fuel truck for fueling, the system automatically collects the information from the harvester 100 using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the harvester 100 until the harvester 100 enters a covered location. The harvester 100, itself, can then send the information to the main network.

It will also be noted that the elements of FIGS. 1-4 or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 10:
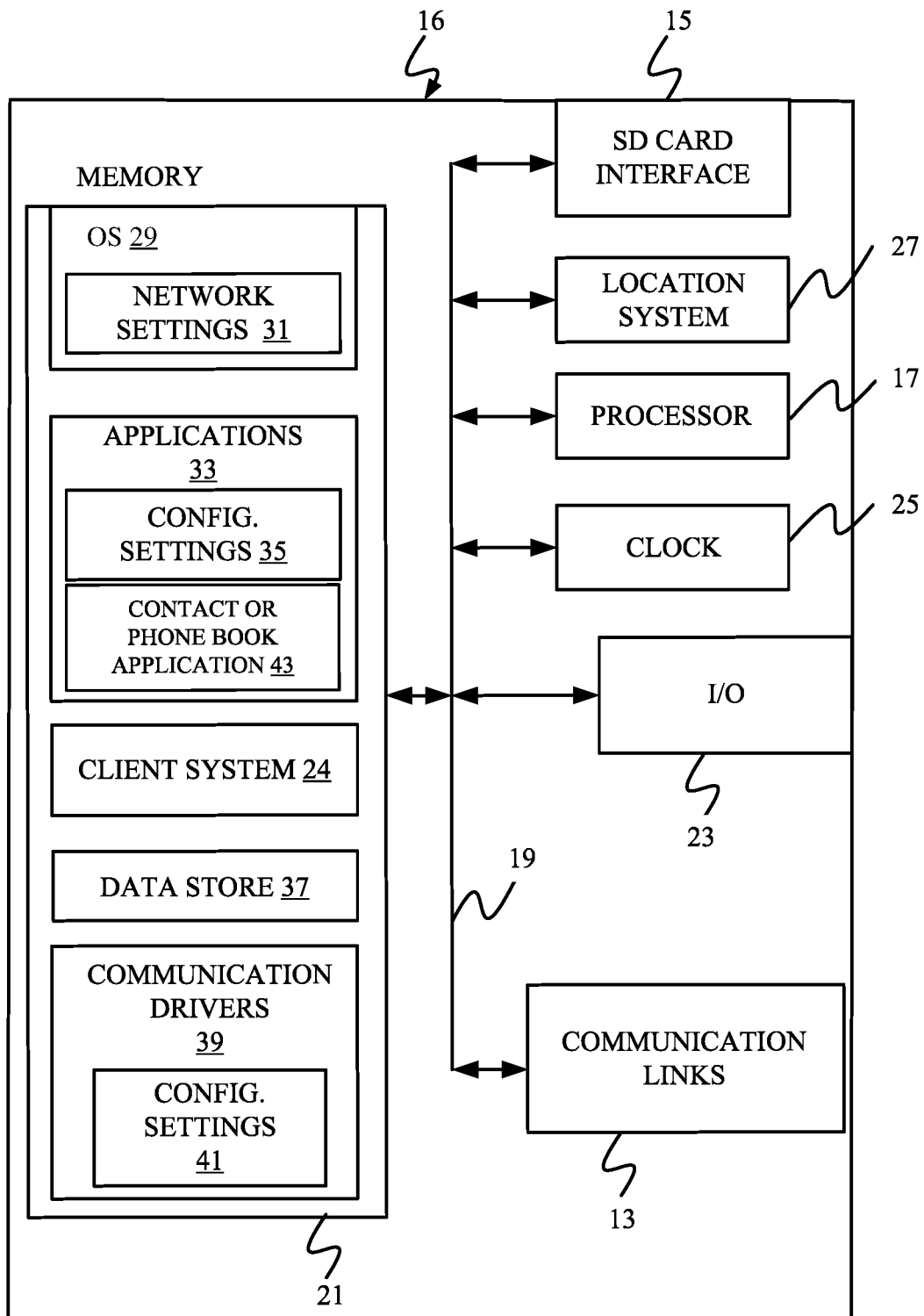
FIGS. 10-12 show examples of mobile devices that can be used in harvesters.
Figure 11:
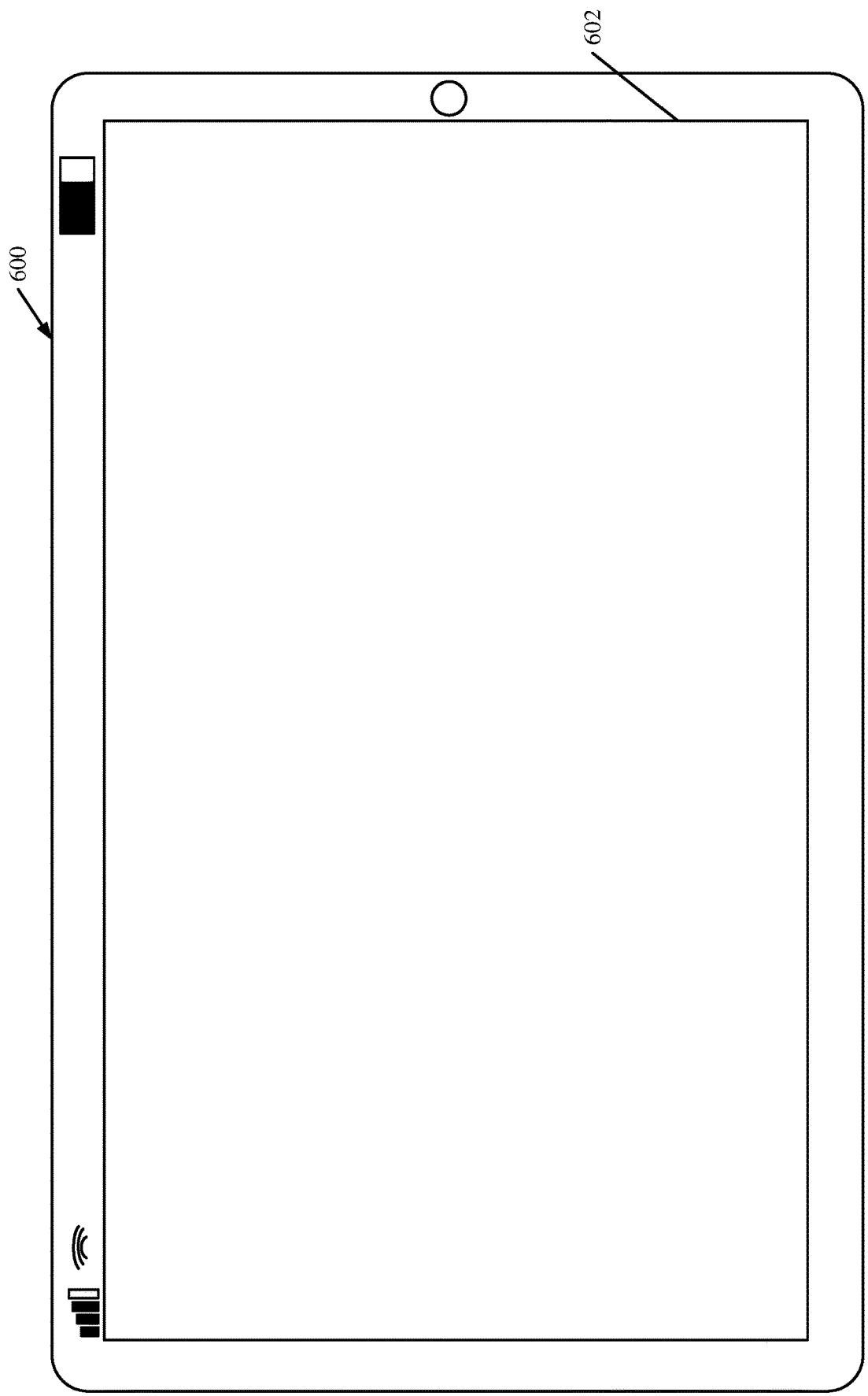
Figure 12:
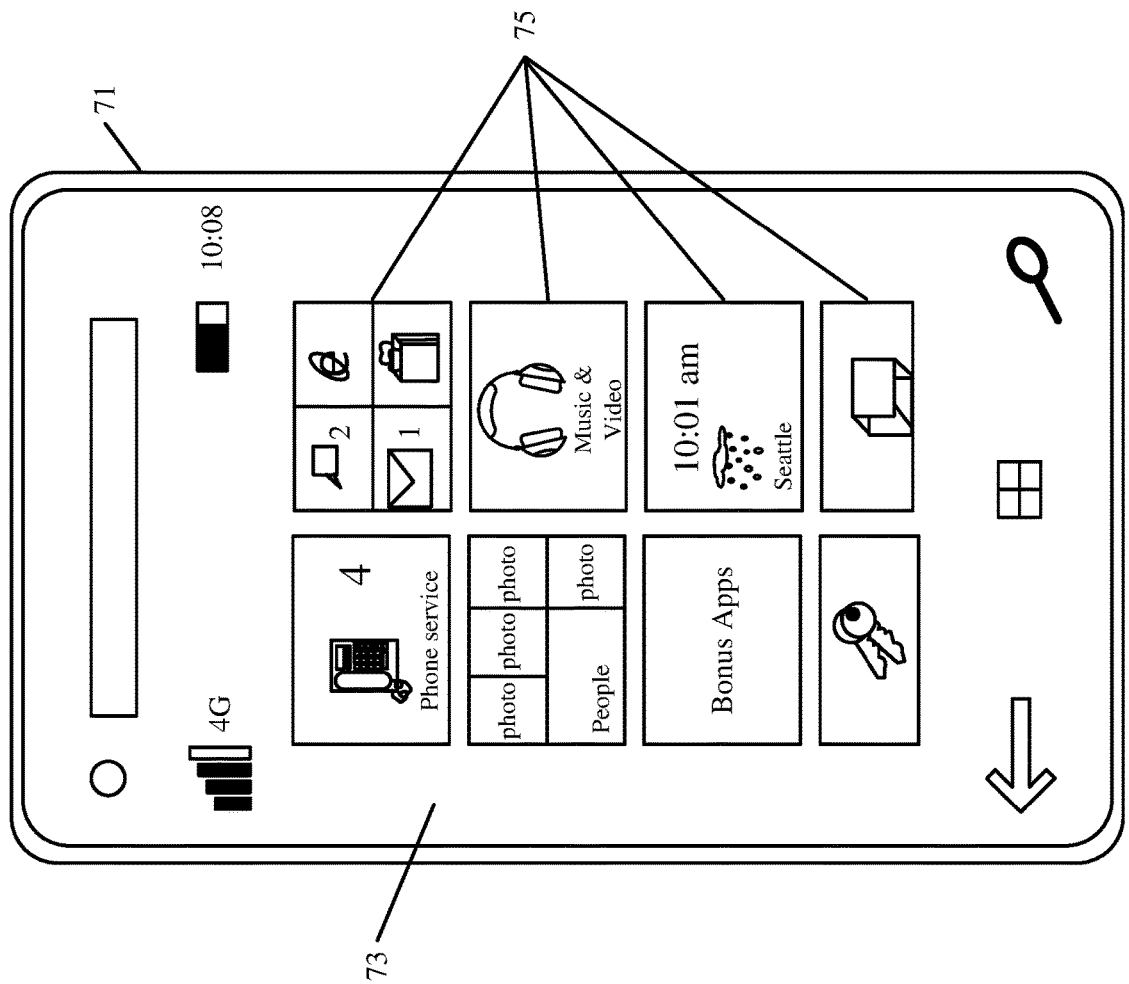

FIG. 10 is a simplified block diagram of one illustrative example of a handheld or mobile computing device that can be used as a user's or client's hand held device 16, in which the present system (or parts of it) can be deployed. For instance, a mobile device can be deployed in the operator compartment of harvester 100 for use in generating, processing, or displaying the spout and flap and turn data. FIGS. 11-12 are examples of handheld or mobile devices.

FIG. 10 provides a general block diagram of the components of a client device 16 that can run some components shown in FIG. 4, that interacts with them, or both. In the device 16, a communications link 13 is provided that allows the handheld device to communicate with other computing devices and under some embodiments provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors/servers from previous FIGS.) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. Memory 21 can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 11 shows one example in which device 16 is a tablet computer 600. In FIG. 11, computer 600 is shown with user interface display screen 602. Screen 602 can be a touch screen or a pen-enabled interface that receives inputs from a pen or stylus. computer 600 can also use an on-screen virtual keyboard. Of course, computer 600 might also be attached to a keyboard or other user input device through a suitable attachment mechanism, such as a wireless link or USB port, for instance. Computer 600 can also illustratively receive voice inputs as well.

FIG. 12 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 13:
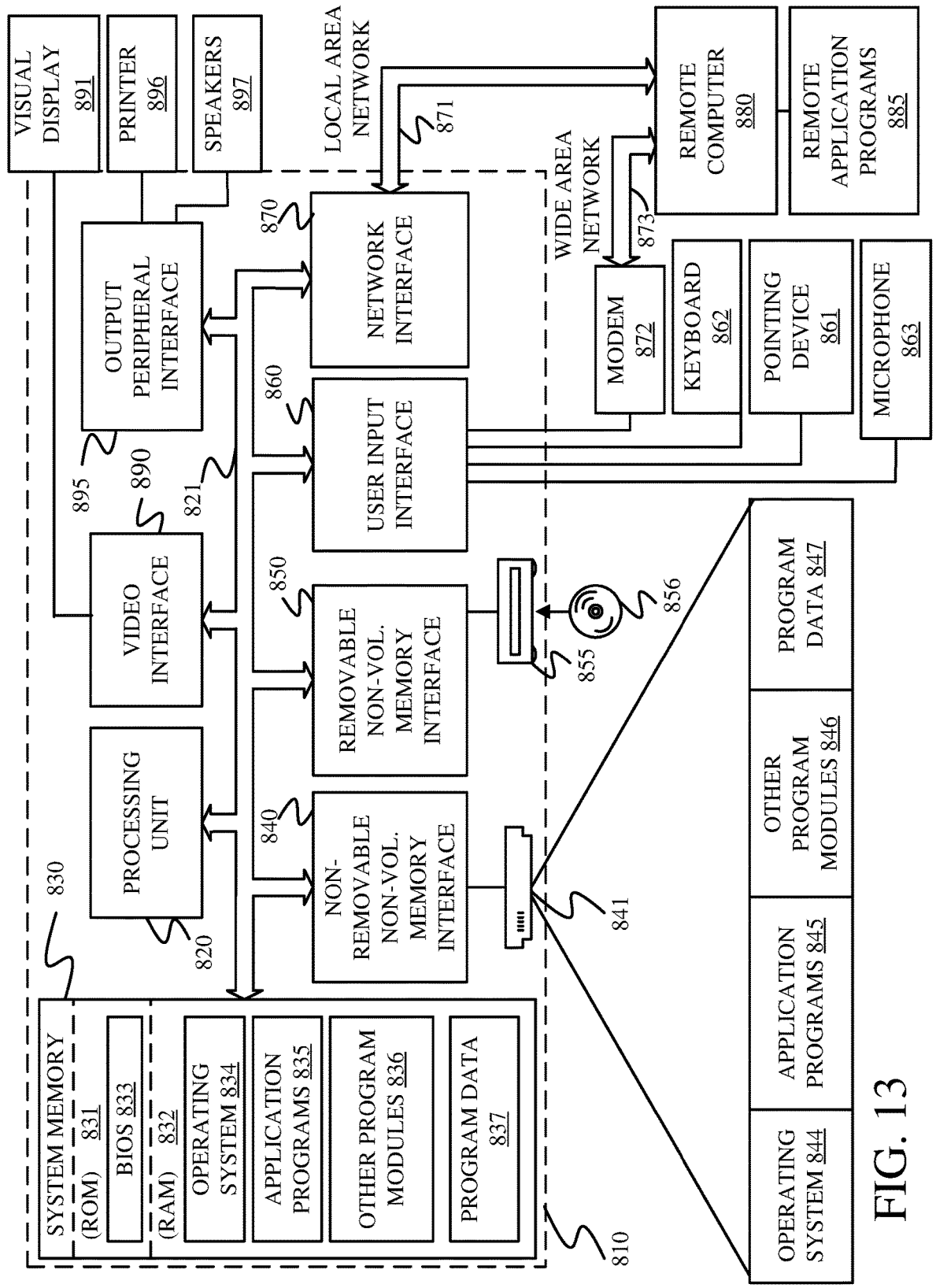
FIG. 13 is a block diagram of a computing environment that can be used in the machines, systems, and architectures shown and discussed with respect to the previous figures.

FIG. 13 is one example of a computing environment in which elements of FIGS. 1-4, or parts of it, (for example) can be deployed. With reference to FIG. 13, an example system for implementing some embodiments includes a computing device in the form of a computer 810 programmed to operate as discussed above. Components of computer 810 may include, but are not limited to, a processing unit 820 (which can comprise processor or servers from pervious FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIGS. 1-4 can be deployed in corresponding portions of FIG. 13.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 13 illustrates operating system 834, application programs 835, other program modules 836, and program data 837.

The computer 810 may also include other removable/non-removable volatile/nonvolatile computer storage media. By way of example only, FIG. 13 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 13, provide storage of computer readable instructions, data structures, program modules and other data for the computer 810. In FIG. 13, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a controller area network—CAN, local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 13 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Example 1 is an agricultural harvester, comprising:
- a spout configured to be positioned at a first spout position relative to a receiving vehicle, the receiving vehicle defining a receiving vessel and the spout, when positioned in the first spout position, directing harvested material to fill the receiving vessel with the harvested material;
- a display device;
- an operator interface display generator configured to generate a display on the display device, the display being representative of the receiving vehicle;
- an operator interaction detection system configured to detect an operator reposition command on the displayed receiving vehicle on the display device and identify a second spout position relative to the receiving vehicle based on the operator reposition command; and
- a reposition control signal generator configured to generate a control signal to automatically move the spout to the second spout position relative to the receiving vehicle.

Example 2 is the agricultural harvester of any or all previous examples wherein the operator interaction detection system comprises:
- an operator input detector configured to detect the operator reposition command on the displayed receiving vehicle on the display device by detecting selection of a set of pixels displaying a portion of the displayed receiving vehicle on the display device.

Example 3 is the agricultural harvester of any or all previous examples wherein the operator interaction detection system comprises:
- a setpoint location identifier configured to identify the second spout position based on a location of the set of selected pixels that is displaying the portion of the displayed receiving vehicle.

Example 4 is the agricultural harvester of any or all previous examples wherein the operator input detector comprises at least one of:
- a touch gesture detector configured to detect a touch gesture on the set of selected pixels; or
- a point and click detector configured to detect a point and click input on the set of selected pixels.

Example 5 is the agricultural harvester of claim of any or all previous examples wherein the reposition control signal generator comprises:
- a spout control signal generator configured to generate a spout actuator control signal to control a spout actuator to move the spout relative to a frame of the agricultural harvester.

Example 6 is the agricultural harvester of claim of any or all previous examples wherein the reposition control signal generator comprises:
- a machine synchronization control signal generator configured to automatically change a position of the agricultural harvester relative to the receiving vehicle.

Example 7 is the agricultural harvester of any or all previous examples and further comprising:
- a resume detector configured to detect resume criteria wherein the reposition control signal generator is configured to automatically move the spout back to the first spout position based on detection of the resume criteria.

Example 8 is the agricultural harvester of any or all previous examples and further comprising an automatic fill control system configured to execute an automatic fill operation according to an automatic fill strategy and wherein reposition control signal generator is configured to temporarily suspend the automatic fill operation automatically before moving the spout to the second spout position, and to automatically resume the automatic fill operation based on detection of the resume criteria.

Example 9 is a method of controlling an agricultural harvester in performing a filling operation, comprising:
- generating a display representative of a receiving vehicle, that defines a receiving vessel for receiving harvested material, on a display device;
- positioning a spout of the agricultural harvester at a first spout position relative to the receiving vehicle;
- detecting an operator reposition command on the displayed receiving vehicle on the display device;
- identifying a second spout position relative to the receiving vehicle based on the operator reposition command; and
- automatically moving the spout to the second spout position relative to the receiving vehicle.

Example 10 is the method of any or all previous examples wherein detecting an operator reposition command comprises:
- detecting selection of a set of pixels displaying a portion of the displayed receiving vehicle on the display device; and
- identifying the set of pixels as a set of selected pixels.

Example 11 is the method of any or all previous examples wherein identifying a second spout position comprises:
- identifying the second spout position based on a location of the set of selected pixels that is displaying the portion of the displayed receiving vehicle.

Example 12 is the method of any or all previous examples wherein detecting selection of a set of pixels comprises:
- detecting a touch gesture on the set of selected pixels.

Example 13 is the method of any or all previous examples wherein detecting selection of a set of pixels comprises:
- detecting a point and click input on the set of selected pixels.

Example 14 is the method of claim of any or all previous examples wherein automatically moving the spout to the second spout position comprises:
- generating a spout actuator control signal to control a spout actuator to move the spout relative to a frame of the agricultural harvester.

Example 15 is the method of claim of any or all previous examples wherein automatically moving the spout to the second spout position comprises:
- automatically changing a position of the agricultural harvester relative to the receiving vehicle.

Example 16 is the method of any or all previous examples and further comprising:

detecting resume criteria; and
automatically moving the spout back to the first spout position based on detection of the resume criteria.

Example 17 is the method of any or all previous examples wherein the agricultural harvester is executing an automatic fill operation according to an automatic fill strategy and wherein automatically moving the spout to the second spout position comprises:
temporarily suspending the automatic fill operation.

Example 18 is the method of any or all previous examples wherein automatically moving the spout back to the first spout position comprises:
resuming the automatic fill operation.

Example 19 is the method of any or all previous examples and further comprising:
detecting a touch gesture on the display;
identifying an automatic fill strategy based on the touch gesture; and
implementing the identified automatic fill strategy.

Example 20 is an agricultural harvester, comprising:
a spout configured to be positioned at a first spout position relative to a receiving vehicle, the receiving vehicle defining a receiving vessel and the spout, when positioned in the first spout position, directing harvested material to fill the receiving vessel with the harvested material;
a display device;
an operator interface display generator configured to generate a display on the display device, the display being representative of the receiving vehicle;
an operator input detector configured to detect, as an operator reposition command on the displayed receiving vehicle on the display device, a set of pixels displaying a portion of the displayed receiving vehicle on the display device;
an operator interaction detection system configured identify a second spout position relative to the receiving vehicle based on the set of pixels;
a reposition control signal generator configured to generate a control signal to automatically move the spout to the second spout position relative to the receiving vehicle; and
a resume detector configured to detect resume criteria wherein the reposition control signal generator is configured to automatically move the spout back to the first spout position based on detection of the resume criteria.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. An agricultural harvester, comprising:
a spout configured to be positioned at a first spout position relative to a receiving vehicle, the receiving vehicle defining a receiving vessel and the spout, when positioned in the first spout position, directing harvested material to fill the receiving vessel with the harvested material;
a display device;
one or more processors;
memory;
computer executable instructions stored in the memory, the computer executable instructions, when executed by the one or more processors, configuring the one or more processors to:
generate a display on the display device, the display being representative of the receiving vehicle;
detect an operator reposition command on the displayed receiving vehicle on the display device and identify a second spout position relative to the receiving vehicle based on the operator reposition command; and
generate a control signal to automatically move the spout to the second spout position relative to the receiving vehicle.

2. The agricultural harvester of claim 1 wherein the computer executable instructions, when executed by the one or more processors, further configure the one or more processors to:
detect the operator reposition command on the displayed receiving vehicle on the display device by detecting selection of a set of pixels displaying a portion of the displayed receiving vehicle on the display device.

3. The agricultural harvester of claim 2 wherein the computer executable instructions, when executed by the one or more processors, further configure the one or more processors to:
identify the second spout position based on a location of the set of selected pixels that is displaying the portion of the displayed receiving vehicle.

4. The agricultural harvester of claim 3 wherein the computer executable instructions, when executed by the one or more processors, further configure the one or more processors to:
detect a touch gesture on the set of selected pixels; or
detect a point and click input on the set of selected pixels.

5. The agricultural harvester of claim of claim 1 wherein the computer executable instructions, when executed by the one or more processors, further configure the one or more processors to:
generate, as the control signal a spout actuator control signal to control a spout actuator to move the spout relative to a frame of the agricultural harvester.

6. The agricultural harvester of claim of claim 1 wherein the computer executable instructions, when executed by the one or more processors, further configure the one or more processors to:
generate, as the control signal, a control signal to change a position of the agricultural harvester relative to the receiving vehicle to move the spout to the second spout position relative to the receiving vehicle.

7. The agricultural harvester of claim 1 wherein the computer executable instructions, when executed by the one or more processors, further configure the one or more processors to:
detect resume criteria and to automatically move the spout back to the first spout position based on detection of the resume criteria.

8. The agricultural harvester of claim 7 wherein the computer executable instructions, when executed by the one or more processors, further configure the one or more processors to; and
execute an automatic fill operation according to an automatic fill strategy and to temporarily suspend the automatic fill operation automatically before moving the spout to the second spout position, and to automatically resume the automatic fill operation based on detection of the resume criteria.

9. A method of controlling an agricultural harvester in performing a filling operation, comprising:
- generating a display representative of a receiving vehicle, that defines a receiving vessel for receiving harvested material, on a display device;
- positioning a spout of the agricultural harvester at a first spout position relative to the receiving vehicle;
- detecting an operator reposition command on the displayed receiving vehicle on the display device;
- identifying a second spout position relative to the receiving vehicle based on the operator reposition command; and
- automatically moving the spout to the second spout position relative to the receiving vehicle.

10. The method of claim 9 wherein detecting an operator reposition command comprises:
- detecting selection of a set of pixels displaying a portion of the displayed receiving vehicle on the display device; and
- identifying the set of pixels as a set of selected pixels.

11. The method of claim 10 wherein identifying a second spout position comprises:
- identifying the second spout position based on a location of the set of selected pixels that is displaying the portion of the displayed receiving vehicle.

12. The method of claim 11 wherein detecting selection of a set of pixels comprises:
- detecting a touch gesture on the set of selected pixels.

13. The method of claim 11 wherein detecting selection of a set of pixels comprises:
- detecting a point and click input on the set of selected pixels.

14. The method of claim of claim 9 wherein automatically moving the spout to the second spout position comprises:
- generating a spout actuator control signal to control a spout actuator to move the spout relative to a frame of the agricultural harvester.

15. The method of claim of claim 9 wherein automatically moving the spout to the second spout position comprises:
- automatically changing a position of the agricultural harvester relative to the receiving vehicle.

16. The method of claim 9 and further comprising:
- detecting resume criteria; and
- automatically moving the spout back to the first spout position based on detection of the resume criteria.

17. The method of claim 16 wherein the agricultural harvester is executing an automatic fill operation according to an automatic fill strategy and wherein automatically moving the spout to the second spout position comprises:
- temporarily suspending the automatic fill operation.

18. The method of claim 16 wherein automatically moving the spout back to the first spout position comprises:
- resuming the automatic fill operation.

19. The method of claim 9 and further comprising:
- detecting a touch gesture on the display;
- identifying an automatic fill strategy based on the touch gesture; and
- implementing the identified automatic fill strategy.

20. An agricultural harvester, comprising:
- a spout configured to be positioned at a first spout position relative to a receiving vehicle, the receiving vehicle defining a receiving vessel and the spout, when positioned in the first spout position, directing harvested material to fill the receiving vessel with the harvested material;
- a display device;
- one or more processors;
- memory; and
- computer executable instructions stored in the memory, the computer executable instructions, when executed by the one or more processors, configuring the one or more processors to:
  - generate a display on the display device, the display being representative of the receiving vehicle;
  - detect, as an operator reposition command on the displayed receiving vehicle on the display device, an operator reposition command on one or more pixels displaying a portion of the displayed receiving vehicle on the display device;
  - identify a second spout position relative to the receiving vehicle based on the operator reposition command on the one or more pixels;
  - generate a control signal to automatically move the spout to the second spout position relative to the receiving vehicle; and
  - detect resume criteria; and
  - automatically move the spout back to the first spout position based on detection of the resume criteria.

* * * * *